（12）United States Patent
Stephens et al.

(10) Patent No.: US 9,810,843 B2
(45) Date of Patent: Nov. 7, 2017

(54) OPTICAL BACKPLANE MIRROR

(71) Applicant: Freescale Semiconductor, Inc., Austin, TX (US)

(72) Inventors: Tab A. Stephens, Austin, TX (US); Perry H. Pelley, Austin, TX (US); Michael B. McShane, Austin, TX (US)

(73) Assignee: NXP USA, INC., Austin, TX (US)

( * ) Notice: Subject to any disclaimer, the term of this patent is extended or adjusted under 35 U.S.C. 154(b) by 85 days.

(21) Appl. No.: 13/914,178

(22) Filed: Jun. 10, 2013

(65) Prior Publication Data

US 2014/0363120 A1    Dec. 11, 2014

(51) Int. Cl.
| G02B 6/12 | (2006.01) |
| G02B 6/136 | (2006.01) |
| G02B 6/13 | (2006.01) |
| G02B 6/125 | (2006.01) |
| G02B 6/43 | (2006.01) |
| G02B 6/42 | (2006.01) |

(52) U.S. Cl.
CPC ............ *G02B 6/136* (2013.01); *G02B 6/125* (2013.01); *G02B 6/131* (2013.01); *G02B 6/43* (2013.01); *G02B 6/4214* (2013.01); *G02B 2006/12061* (2013.01); *G02B 2006/12104* (2013.01)

(58) Field of Classification Search
CPC ........ G02B 6/136; G02B 6/125; G02B 6/131; G02B 6/43; G02B 6/4214; G02B 2006/12061; G02B 2006/12104
USPC ............................................ 385/14; 438/478
See application file for complete search history.

(56) References Cited

U.S. PATENT DOCUMENTS

| 4,130,342 A | 12/1978 | McMahon |
| 4,548,467 A | 10/1985 | Stoerk et al. |
| 4,653,850 A | 3/1987 | Boirat et al. |
| 4,828,358 A | 5/1989 | Blonder |
| 5,020,871 A | 6/1991 | Nishimura |
| 5,321,498 A | 6/1994 | Song et al. |

(Continued)

FOREIGN PATENT DOCUMENTS

| EP | 1172680 A2 | 1/2002 |
| WO | 2006136194 A1 | 12/2006 |

OTHER PUBLICATIONS

Shen, Po-Kuan, et al., "SOI-based trapezoidal waveguide with 45-degree microreflector for non-coplanar light bending", Silicon Photonics VII, Proceedings of SPIE, vol. 8266, Feb. 9, 2012, pp. 1-7.

(Continued)

*Primary Examiner* — Jerry Blevins

(57) ABSTRACT

An integrated circuit optical backplane die and associated semiconductor fabrication process are described for forming optical backplane mirror structures for perpendicularly deflecting optical signals out of the plane of the optical backplane die by selectively etching an optical waveguide semiconductor layer (103) on an optical backplane die wafer using an orientation-dependent anisotropic wet etch process to form a first recess opening (107) with angled semiconductor sidewall surfaces (106) on the optical waveguide semiconductor layer, where the angled semiconductor sidewall surfaces (106) are processed to form an optical backplane mirror (116) for perpendicularly deflecting optical signals to and from a lateral plane of the optical waveguide semiconductor layer.

21 Claims, 10 Drawing Sheets

(56) References Cited

U.S. PATENT DOCUMENTS

| | | | |
|---|---|---|---|
| 5,371,817 A | 12/1994 | Revelli, Jr. et al. | |
| 5,483,174 A | 1/1996 | Hembree et al. | |
| 5,534,784 A | 7/1996 | Lum et al. | |
| 5,631,571 A | 5/1997 | Spaziani et al. | |
| 5,963,554 A | 10/1999 | Song | |
| 6,055,342 A | 4/2000 | Yi et al. | |
| 6,325,553 B1 | 12/2001 | Deacon et al. | |
| 6,335,224 B1 | 1/2002 | Peterson et al. | |
| 6,417,107 B1 | 7/2002 | Sekimura | |
| 6,477,303 B1 | 11/2002 | Witherspoon | |
| 6,556,285 B1 | 4/2003 | Dickson | |
| 6,650,810 B1 | 11/2003 | Lieberman et al. | |
| 6,686,993 B1 | 2/2004 | Karpman et al. | |
| 6,690,845 B1 | 2/2004 | Yoshimura et al. | |
| 6,753,037 B2 | 6/2004 | Miller et al. | |
| 6,765,396 B2 | 7/2004 | Barror | |
| 6,810,165 B2 | 10/2004 | Golub et al. | |
| 6,813,584 B2 | 11/2004 | Zhou et al. | |
| 6,850,081 B1 | 2/2005 | Birdsley et al. | |
| 6,865,311 B2 | 3/2005 | Li et al. | |
| 6,897,663 B1 | 5/2005 | Conn | |
| 6,909,830 B2 | 6/2005 | Lee et al. | |
| 6,936,491 B2 | 8/2005 | Partridge et al. | |
| 6,950,570 B1 | 9/2005 | Novotny | |
| 6,999,651 B2 | 2/2006 | Qian et al. | |
| 7,016,564 B1 | 3/2006 | Graves | |
| 7,020,363 B2 | 3/2006 | Johannessen | |
| 7,042,563 B2 | 5/2006 | Wilsher et al. | |
| 7,071,025 B2 | 7/2006 | Brenner et al. | |
| 7,183,759 B1 | 2/2007 | Malendevich et al. | |
| 7,215,845 B1 | 5/2007 | Chan et al. | |
| 7,224,174 B1 | 5/2007 | Malendevich et al. | |
| 7,271,461 B2 | 9/2007 | Dutta | |
| 7,298,536 B2 | 11/2007 | McCann et al. | |
| 7,379,191 B2 | 5/2008 | Brooks | |
| 7,427,868 B2 | 9/2008 | Strid et al. | |
| 7,440,449 B2 | 10/2008 | Carson et al. | |
| 7,444,042 B1 | 10/2008 | Niblock et al. | |
| 7,450,812 B2 | 11/2008 | Romo et al. | |
| 7,474,420 B2 | 1/2009 | Li et al. | |
| 7,532,785 B1 | 5/2009 | Beausoleil et al. | |
| 7,555,333 B2 | 6/2009 | Wang et al. | |
| 7,586,608 B1 | 9/2009 | Gunn, III et al. | |
| 7,587,106 B2 | 9/2009 | Piede et al. | |
| 7,612,737 B2 | 11/2009 | Bright et al. | |
| 7,630,603 B2 * | 12/2009 | Wu | G02B 6/12007 385/14 |
| 7,664,349 B2 | 2/2010 | Holmstrom et al. | |
| 7,824,945 B2 | 11/2010 | Chang et al. | |
| RE42,124 E | 2/2011 | Riza | |
| 7,982,765 B2 | 7/2011 | Lewis et al. | |
| 8,004,080 B2 | 8/2011 | McShane et al. | |
| 8,014,682 B2 | 9/2011 | Pelley et al. | |
| 8,032,030 B2 | 10/2011 | Pessoa et al. | |
| 8,058,137 B1 | 11/2011 | Or-Bach et al. | |
| 8,064,739 B2 | 11/2011 | Binkert et al. | |
| 8,218,917 B2 | 7/2012 | Sano et al. | |
| 8,260,151 B2 * | 9/2012 | Pelley | G02B 6/12004 257/66 |
| 8,319,230 B1 | 11/2012 | Dutta | |
| 8,442,368 B1 | 5/2013 | Reano et al. | |
| 8,749,772 B2 | 6/2014 | Busico et al. | |
| 8,750,660 B2 | 6/2014 | Levy et al. | |
| 8,766,284 B1 | 7/2014 | Dutta | |
| 8,859,394 B2 | 10/2014 | Dallesasse et al. | |
| 8,916,874 B2 | 12/2014 | Whitbread et al. | |
| 9,091,820 B2 | 7/2015 | Stephens et al. | |
| 9,094,135 B2 | 7/2015 | Pelley et al. | |
| 2002/0012744 A1 | 1/2002 | Miller et al. | |
| 2002/0028045 A1 | 3/2002 | Yoshimura et al. | |
| 2002/0132389 A1 | 9/2002 | Patel et al. | |
| 2003/0017640 A1 | 1/2003 | Barenburg et al. | |
| 2003/0026517 A1 | 2/2003 | Shimoda | |
| 2003/0043289 A1 | 3/2003 | Konno | |
| 2003/0161573 A1 | 8/2003 | Ishida et al. | |
| 2003/0199109 A1 | 10/2003 | Kuzma | |
| 2004/0013359 A1 | 1/2004 | Lee et al. | |
| 2004/0027644 A1 | 2/2004 | Fazi, Jr. | |
| 2004/0036170 A1 * | 2/2004 | Lee et al. | 257/734 |
| 2004/0071387 A1 | 4/2004 | Mule et al. | |
| 2004/0081402 A1 | 4/2004 | Ouchi | |
| 2004/0122328 A1 | 6/2004 | Wang et al. | |
| 2004/0245586 A1 | 12/2004 | Partridge et al. | |
| 2004/0248344 A1 | 12/2004 | Partridge et al. | |
| 2005/0025414 A1 | 2/2005 | Kamiyama et al. | |
| 2005/0058128 A1 | 3/2005 | Carson et al. | |
| 2005/0069253 A1 * | 3/2005 | Heideman | 385/31 |
| 2005/0141808 A1 | 6/2005 | Cheben et al. | |
| 2005/0224946 A1 | 10/2005 | Dutta | |
| 2006/0049826 A1 | 3/2006 | Daneman et al. | |
| 2007/0048898 A1 | 3/2007 | Carlson et al. | |
| 2007/0242919 A1 | 10/2007 | Welch et al. | |
| 2008/0080809 A1 | 4/2008 | Kushiyama et al. | |
| 2008/0181557 A1 | 7/2008 | Wang et al. | |
| 2008/0246106 A1 | 10/2008 | Beausoleil et al. | |
| 2009/0263138 A1 | 10/2009 | Pelley et al. | |
| 2009/0263143 A1 | 10/2009 | Pelley et al. | |
| 2009/0311819 A1 | 12/2009 | Chang et al. | |
| 2010/0236909 A1 | 9/2010 | Biedrzycki et al. | |
| 2011/0057306 A1 | 3/2011 | McShane et al. | |
| 2011/0091157 A1 | 4/2011 | Yao et al. | |
| 2011/0317958 A1 * | 12/2011 | Nadeau et al. | 385/14 |
| 2012/0051695 A1 | 3/2012 | Harada et al. | |
| 2012/0058616 A1 * | 3/2012 | Ahn et al. | 438/285 |
| 2012/0104389 A1 | 5/2012 | Whitbread et al. | |
| 2012/0129301 A1 | 5/2012 | Or-Bach et al. | |
| 2012/0183009 A1 | 7/2012 | Adachi et al. | |
| 2012/0324156 A1 | 12/2012 | Muralimanohar et al. | |
| 2013/0039614 A1 | 2/2013 | Shubin et al. | |
| 2013/0272337 A1 * | 10/2013 | Tan | H01S 5/02284 372/107 |
| 2014/0064659 A1 | 3/2014 | Doerr et al. | |
| 2014/0362425 A1 | 12/2014 | Stephens et al. | |
| 2014/0363119 A1 | 12/2014 | Stephens et al. | |
| 2014/0363120 A1 | 12/2014 | Stephens et al. | |
| 2014/0363124 A1 | 12/2014 | Pelley et al. | |
| 2014/0363153 A1 | 12/2014 | McShane et al. | |
| 2014/0363172 A1 | 12/2014 | Pelley et al. | |
| 2014/0363905 A1 | 12/2014 | McShane et al. | |
| 2015/0253511 A1 | 9/2015 | Pelley | |
| 2016/0011438 A1 | 1/2016 | Reano et al. | |

OTHER PUBLICATIONS

Civitci, F., et al., "Light Turning Mirrors for Hybrid Integration of Optical Waveguides in SiON Technology and CMOS based Photo-detectors", Lasers and Electro-Optics Europe (CLEO Europe/EQEC), 2011 Conference on and 12th European Quantum Electronics Conference, Munich, May 22-26, 2011, 1 page.

Wang, Wei-Chih et al., Development of an Optical Waveguide Cantilever Scanner, Proceedings of SPIE, vol. 4876, 2003.

Ollier, Eric, Optical MEMS Devices Based on Moving Waveguides, IEEE Journal on Selected Topics in Quantum Electronics, vol. 8, No. 1, Jan./Feb. 2002.

Baets, R. et al., Silicon Photonics, IEEE 2007.

Bisaillon, E. et al., Free-Space Optical Link with Spatial Redundancy for Misalignment Tolerance, IEEE Photonics Technology Letters, vol. 14, No. 2, Feb. 2002.

Bowers, John E. et al., Hybrid Silicon Evanescent Laser on a Silicon-on-Insulator Waveguide, 2006.

Siebel, U. et al., Crosstalk-Enhanced Polymer Digital Optical Switch Based on a W-Shape, IEEE Photonics Technology Letters, vol. 12, No. 1, Jan. 2000.

Paniccia, Mario, Intel Corporation, First Electrically Pumped Hybrid Silicon Laser, UCSB Engineering Insights, Oct. 18, 2006.

Paniccia, Mario, Intel Corporation, First Electrically Pumped Hybrid Silicon Laser, UCSB Engineering Insights, http://www.intel.com/content/dam/www/public/us/en/documents/technology-briefs/intel-labs-hybrid-silicon-laser-announcement.pdf, Sep. 18, 2006.

Samara-Rubio, Dean et al., Customized Drive Electronics to Extend Silicon Optical Modulators to 4 Gb/s, IEEE Journal of Lightwave Technology, vol. 23, No. 12, Dec. 2005.

(56) References Cited

OTHER PUBLICATIONS

Johnson, R. Colin, Intel demos 40-Gbit/s Silicon Laser, Aug. 22, 2007.
RP Phototonics, Beam Splitters, http://www.rp-phototonics.com/beam_splitters.html, printed May 13, 2013.
Computer weekly.com, IBM debuts prototype terabit optical chip "Holey Optochip," http://www.computerweekly.com/news/2240146552/IBM-unveils-prototype-terabit-optcal-chip, Mar. 8, 2012.
A.N. Udipi et al., Combining Memory and a Controller with Photonics through 3D-Stacking to Enable Scalable and Energy-Efficient Systems, ISCA Jun. 4-8, 2011 http://www.cs.utah.edu/~rajeev/pubs/isca11.pdf.
D. Vantrease et al., Corona: System Implications of Emerging Nanophotonic Technology, ISCA '08 Proceedings of the 35th Annual International Symposium on Computer Architecture, pp. 153-164 http://pages.cs.wisc.edu/~danav/pubs/papers/isca08_corona.pd.
R. Goodwins, Inside Intel's 50 Gbps silicon optics, Jul. 27, 2010, printed Mar. 21, 2013 http://www.zdnet.com/inside-intels-50gbps-silicon-optics-3040089657/.
P. Ramm et al., Through Silicon Via Technology—Process and Reliability for Wafer-Level 3D System Integration, IEEE 2008 Electronic Components and Technology Conference, pp. 841-846.
M. Lapedus, Semiconductor Manufacturing & Design Community, Options and Hurdles Come into Focus for 3D Stacking, http://semimd.com/blog/2012/05/29/6210/, printed May 13, 2013.
C. Strandman et al., Fabrication of 45-degree Mirrors Together with Well-Defined V-Grooves Using Wet Anisotropic Etching of Silicon, IEEE Journal of Microelectromechanical Systems, vol. 4, No. 4, Dec. 1995.
M. Immonen et al., Fabrication and Characterization of Polymer Optical Waveguides with Integrated Micromirrors for Three-Dimensional Board-Level Optical Interconnects, IEEE Transactions on Electronics Packaging Manufacturing, vol. 28, No. 4, Oct. 2005.
K-W Lee et al., 3D Heterogeneous Opto-Electronic Integration Technology for System-on-Silicon (SOS), 2009 IEEE International Electron Devices Meeting (IEDM), Dec. 7-9, 2009.
J. Brouckaert et al., Thin-Film III-V Photodetectors Integrated on Silicon-on-Insulator Photonic ICs, IEEE Journal of Lightwave Technology, vol. 25, No. 4, Apr. 2007.
RP Photonics, Dielectric Coatings, http://www.rp-phototonics.com/dielectric_coatings.html, printed Apr. 16, 2013.
RP Photonics, Dielectric Mirrors, http://www.rp-phototonics.com/dielectric_mirrors.html, printed Apr. 16, 2013.
Noriki, A., et al, "Through Silicon Photonic Via (TSPV) with Si Core for Low Loss and High-Speed Data Transmission in Opto-Electronic 3-D LSI", 3D Systems Integration Conference (3DIC), 2010 IEEE International, Nov. 16-18, 2010.
Restriction Requirement dated Dec. 18, 2014 in U.S. Appl. No. 13/914,089.
Restriction Requirement dated Nov. 13, 2014 in U.S. Appl. No. 13/914,049.
Restriction Requirement dated Sep. 9, 2014 in U.S. Appl. No. 13/913,993.
Extended European Search Report dated Oct. 13, 2014 in EP Application No. 14170945.1.
Hauffe, R., et al., "Crosstalk-Optimized Integrated Optical Switching Matrices in Polymers by Use of Redundant Switch Elements", IEEE Photonics Technology Letters, vol. 13, No. 3, Mar. 2001.
Non-final office action dated Feb. 2, 2015 in U.S. Appl. No. 13/914,049.
Non-final office action dated Feb. 25, 2015 in U.S. Appl. No. 13/913,993.
Notice of Allowance dated Apr. 14, 2015 in U.S. Appl. No. 13/914,021.
Notice of Allowance dated May 11, 2015 in U.S. Appl. No. 13/914,049.
Non-final office action dated Jun. 3, 2015 in U.S. Appl. No. 13/914,089.
Non-final office action dated Jun. 5, 2015 in U.S. Appl. No. 13/914,199.
Final office action dated Aug. 21, 2015 in U.S. Appl. No. 13/913,993.
Non-final office action dated Sep. 17, 2015 in U.S. Appl. No. 13/914,123.
Non-final office action dated Sep. 25, 2015 in U.S. Appl. No. 13/914,149.
Notice of Allowance dated Nov. 23, 2015 in U.S. Appl. No. 13/913,993.
Final office action dated Dec. 2, 2015 in U.S. Appl. No. 13/914,199.
Final office action dated Dec. 11, 2015 in U.S. Appl. No. 13/914,089.
Notice of Allowance dated Feb. 11, 2016 in U.S. Appl. No. 13/914,123.
Final office action dated Feb. 17, 2016 in U.S. Appl. No. 13/914,149.
Non-final office action dated Apr. 7, 2016 in U.S. Appl. No. 13/914,199.
Notice of Allowance dated May 12, 2016 in U.S. Appl. No. 13/914,123.
Non-final office action dated Jun. 6, 2016 in U.S. Appl. No. 13/914,149.
Notice of Allowance dated Aug. 1, 2016 in U.S. Appl. No. 13/914,089.
Final office action dated Oct. 3, 2016 in U.S. Appl. No. 13/914,199.
Non-final office action dated Jul. 21, 2017 in U.S. Appl. No. 13/914,199.
Non-final office action dated Dec. 30, 2016 in U.S. Appl. No. 13/914,149.
Non-final office action dated Jan. 5, 2017 in U.S. Appl. No. 13/914,199.
Notice of Allowance dated Jul. 18, 2017 in U.S. Appl. No. 13/914,149.

* cited by examiner

OPTICAL BACKPLANE MIRROR

CROSS-REFERENCE TO RELATED APPLICATIONS

U.S. patent application Ser. No. 13/913,993, entitled "Optical Wafer and Die Probe Testing," by inventors Michael B. McShane, Perry H. Pelley, and Tab A. Stephens, filed herewith Jun. 10, 2013, describes exemplary methods and systems and is incorporated by reference in its entirety.

U.S. patent application Ser. No. 13/914,021, entitled "Die Stack with Optical TSVS," by inventors Perry H. Pelley, Tab A. Stephens, and Michael B. McShane, filed herewith Jun. 10, 2013, describes exemplary methods and systems and is incorporated by reference in its entirety.

U.S. patent application Ser. No. 13/914,049, entitled "Communication System Die Stack," by inventors Tab A. Stephens, Perry H. Pelley, and Michael B. McShane, filed herewith Jun. 10, 2013, describes exemplary methods and systems and is incorporated by reference in its entirety.

U.S. patent application Ser. No. 13/914,089, entitled "Integration of a MEMS Beam with Optical Waveguide and Deflection in Two Dimensions," by inventors Tab A. Stephens. Perry H. Pelley, and Michael B. McShane, filed herewith Jun. 10, 2013, describes exemplary methods and systems and is incorporated by reference in its entirety.

U.S. patent application Ser. No. 13/914,123, entitled "Method and Apparatus for Beam Control with Optical MEMS Beam Waveguide," by inventor Perry H. Pelley, filed herewith Jun. 10, 2013, describes exemplary methods and systems and is incorporated by reference in its entirety.

U.S. patent application Ser. No. 13/914,149, entitled "Optical Redundancy," by inventors Perry H. Pelley, Tab A. Stephens, and Michael B. McShane, filed herewith Jun. 10, 2013, describes exemplary methods and systems and is incorporated by reference in its entirety.

U.S. patent application Ser. No. 13/914,199, entitled "Optical Die Test Interface." by inventors Michael B. McShane, Perry H. Pelley, and Tab A. Stephens, filed Jun. 10, 2013, describes exemplary methods and systems and is incorporated by reference in its entirety.

BACKGROUND OF THE INVENTION

Field of the Invention

The present invention is directed in general to semiconductor devices and methods for manufacturing same. In one aspect, the present invention relates to the fabrication of optical interface structures for routing optical signals to and from one or more mounted semiconductor devices or integrated circuits.

Description of the Related Art

Integration of optical communication systems into integrated circuit (IC) chips is considered a promising solution for overcoming physical limitations in high-frequency, high-density information systems. But in addition to the difficulty of integrating optical communication systems within IC chips, there are challenges associated with integrating optical interconnects between IC chips. In this area, there have been proposed a number of optical chip-to-chip interconnect systems, such as free-space connections, embedded fibers, guided wave connections, and embedded multimode waveguides used in printed circuit boards or other conventional backplane connectors. Even so, there remain many technical challenges to realizing efficient optical coupling between optical communication systems at each IC chip, including reducing positional or signal alignment inaccuracies in the optical path (that can decrease the coupling efficiency or lead to transmission failure), accounting for perpendicular alignment between an IC chip relative to the backplane interconnect, and the fabrication costs and complexities associated with forming optical interconnects (e.g., active optoelectronic devices) that are capable of coupling optical signals between IC chips. Attempts have been made to overcome these challenges by using fiber optic waveguides and/or external mirrors or deflectors in the printed circuit board or off chip to optically transfer information between different IC chips, but these solutions present their own difficulties, costs, and control requirements. For example, fiber optic waveguides not only have additional costs and complexity, but may also impose bandwidth limitations on chip-to-chip communications. In addition, the cost for designing and assembling the optical transmitter, external mirrors or deflectors, and the optical receiver, as well as the requirements for achieving alignment with these components to ensure a desired level of information transmission, may be cost prohibitive. Finally, control circuits and external signal deflection structures can increase the overall system complexity, thereby reducing possible signal bandwidth between different IC chips. As a result, the existing solutions for interconnecting optical communication systems from different IC chips make the implementation of high bandwidth optical interconnects extremely difficult at a practical level.

BRIEF DESCRIPTION OF THE DRAWINGS

The present invention may be understood, and its numerous objects, features and advantages obtained, when the following detailed description is considered in conjunction with the following drawings, in which.

Figure 1:
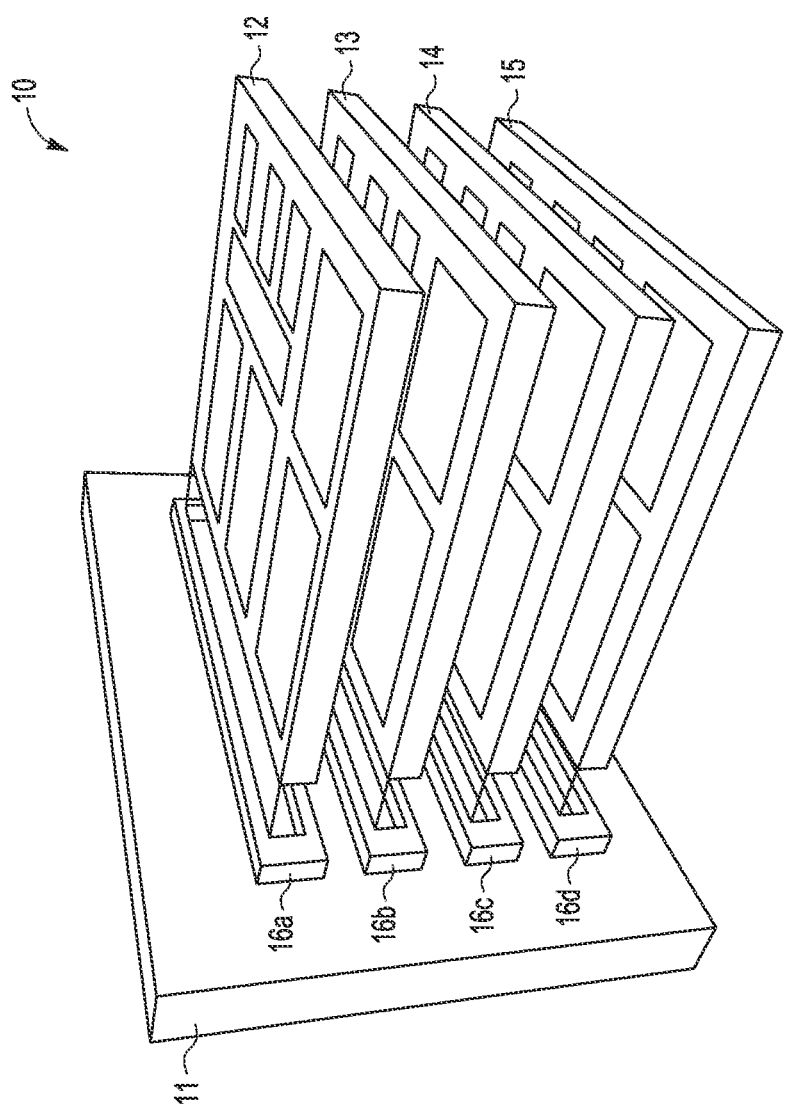
FIG. 1 illustrates a perspective view of a plurality of integrated circuit die prior to assembly and attachment to an optical backplane die.

It will be appreciated that for simplicity and clarity of illustration, elements illustrated in the drawings have not necessarily been drawn to scale. For example, the dimensions of some of the elements are exaggerated relative to other elements for purposes of promoting and improving clarity and understanding. Further, where considered appropriate, reference numerals have been repeated among the drawings to represent corresponding or analogous elements.

DETAILED DESCRIPTION

There are disclosed herein improved optical communication systems, methods, and apparatus that address various problems in the art where various limitations and disadvantages of conventional solutions and technologies will become apparent to one of skill in the art after reviewing the remainder of the present application with reference to the drawings and detailed description provided herein. In selected embodiments, a high density, low power, high performance information system, method and apparatus are described in which integrated optical communications are provided by forming an integrated circuit die with optical mirror structures to move optical signals through and around one or more integrated circuit die mounted or communicating with the integrated circuit die. In embodiments where one or more vertical die or die stacks are mounted on an optical backplane die, optical connections between different die are providing by using bulk silicon micromachining technology to fabricate 45 degree mirror structures in the die to transition the optical signals conveyed in beam waveguides perpendicularly into and out of the optical backplane. In other embodiments, the 45 degree optical mirror structures may be fabricated in any integrated circuit die to transition the optical signals into and out of the plane of the integrated circuit die. More generally, the mirror structures are formed in an integrated circuit die to perpendicularly deflect or otherwise route optical signals into and out of the lateral plane of a die, where "perpendicular" deflection as used herein may refer to 90 degree deflection angles for optical signals, or any other designed deflection angle resulting from deflection by an angled mirror structures as disclosed herein. In this way, the optical mirror structures may be produced at a reduced cost with greater precision and alignment than is available for mechanically produced structures.

In this disclosure, an improved system, apparatus, and fabrication method are described for fabricating a die to include mirror structures for reflecting optical signals into and/or out of the plane of the die (or vice versa), thereby addressing various problems in the art where various limitations and disadvantages of conventional solutions and technologies will become apparent to one of skill in the art after reviewing the remainder of the present application with reference to the drawings and detailed description provided herein. Various illustrative embodiments of the present invention will now be described in detail with reference to the accompanying figures. While various details are set forth in the following description, it will be appreciated that the present invention may be practiced without these specific details, and that numerous implementation-specific decisions may be made to the invention described herein to achieve the device designer's specific goals, such as compliance with process technology or design-related constraints, which will vary from one implementation to another. While such a development effort might be complex and time-consuming, it would nevertheless be a routine undertaking for those of ordinary skill in the art having the benefit of this disclosure. For example, selected aspects are depicted with reference to simplified cross sectional drawings of a semiconductor device without including every device feature or geometry in order to avoid limiting or obscuring the present invention. Such descriptions and representations are used by those skilled in the art to describe and convey the substance of their work to others skilled in the art. In addition, although specific example materials are described herein, those skilled in the art will recognize that other materials with similar properties can be substituted without loss of function. It is also noted that, throughout this detailed description, certain materials will be formed and removed to fabricate the 45 degree mirror structures in the integrated circuit die. Where the specific procedures for forming or removing such materials are not detailed below, conventional techniques to one skilled in the art for growing, depositing, removing or otherwise forming such layers at appropriate thicknesses shall be intended. Such details are well known and not considered necessary to teach one skilled in the art of how to make or use the present invention.

Turning now to FIG. 1, there is shown a perspective view of a communication system 10 wherein a plurality of integrated circuit die 12-15 are assembled for attachment (though not yet attached) to an optical backplane die 11 to form a module of edge mounted die 12-15. As illustrated, the optical backplane die 11 serves as a module substrate by providing a plurality of connection features or slots, such as slots 16, each for receiving one of the integrated circuit die 12-15. As described more fully herein, the optical backplane die 11 is formed with semiconductor substrate, such as a silicon substrate, on which selected MEMS optical beam waveguide and interconnect features (not shown) are formed. In selected embodiments, the optical backplane die 11 may represent a plurality of assembled optical backplane die, thus allowing for larger backplanes than a single die would represent. In addition, the optical backplane die 11 may include one or more passivation or dielectric layers and/or other semiconductor or connection features formed to cover the MEMS optical beam waveguide and interconnect features and to include the connection features or slots 16 which are formed to extend across the optical backplane die 11, from edge to edge. In selected embodiments, the optical backplane die 11 may include any number of slots 16 for receiving any number of integrated circuits. With this arrangement, the die edge of integrated circuit die 12 can be placed into slot 16a, thus edge mounting integrated circuit 12 to the optical backplane die 11. In similar fashion, each of the respective die edges of the integrated circuit die 13-15 can be edge mounted into slots 16b-16d, respectively, of the integrated circuit die 15 of the optical backplane die 1. Though not shown, each of the edge mounted die 12-15 will include die edge connectors and/or contacts which may be used to provide electrical and/or optical connections from electronic circuits (not shown) within each die 12-14 to circuiticonductors (not shown) in the optical backplane die 11. In addition or in the alternative, electrically conductive devices (such as solder ball, copper pillars, or flip-chip conductors) formed on each die edge (not shown) can be used to electrically connect the die 12-15 to the optical backplane die 11. Though illustrated as separate die, it will be appreciated that the plurality of separate integrated circuit die 12-15 may be implemented as a die stack module, wherein each die is formed with through-silicon vias (TSVs), copper pillars, and flip chip bumps to provide vertical signal and power conductors for the die stack module. In addition, each die, whether separately attached or included in a stacked die arrangement) may include optical MEMS devices, such as optical beam waveguides and optical feed-throughs (not shown), for sending and/or receiving lateral optical beam signals through the optical backplane die 11 to adjacent die. Mechanical support structures for attaching the separate integrated circuit die 12-15 to the optical backplane die 11 are not shown.

Figure 2:
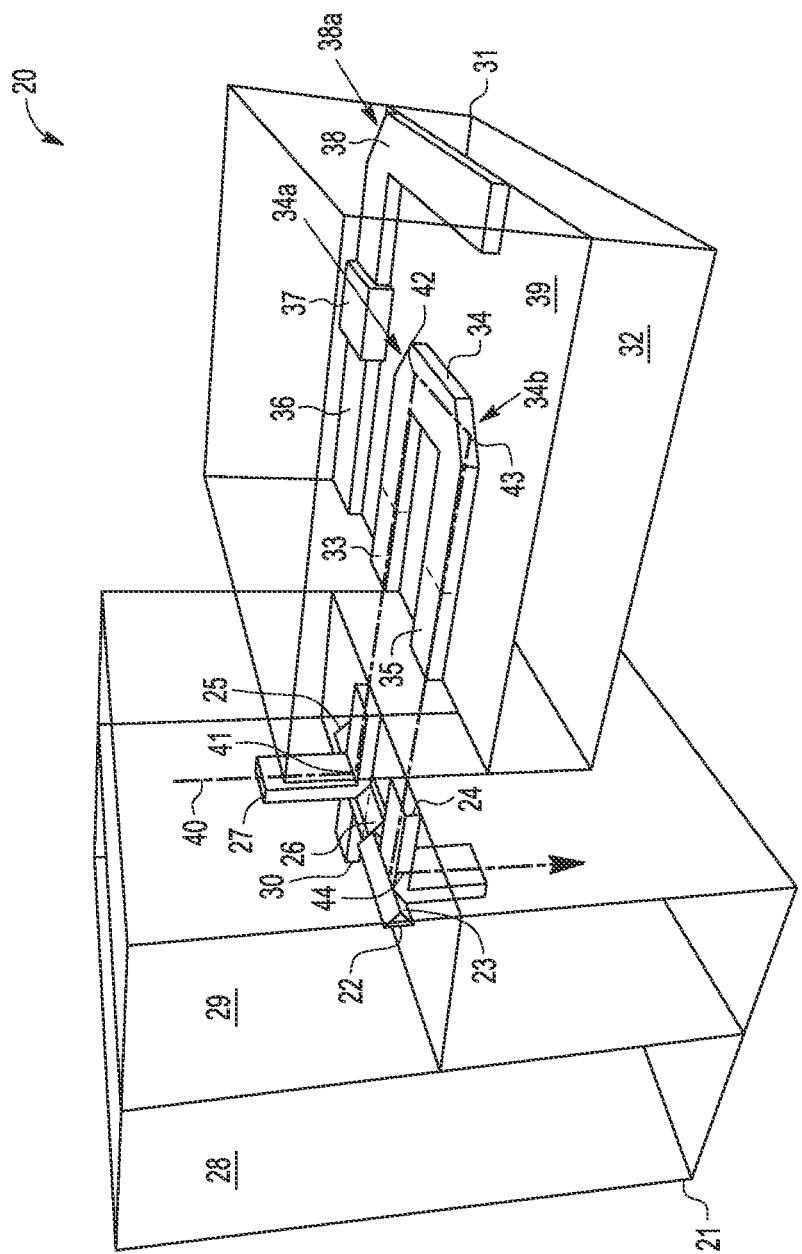
FIG. 2 illustrates an enlarged, detailed perspective view of FIG. 1 to show selected MEMS optical beam waveguide and interconnect features with one or more optical backplane mirror structures for providing an optical signal path in and through the integrated circuit die and optical backplane die.

Turning now to FIG. 2, there is shown an enlarged perspective view 20 of FIG. 1 to illustrate structural details of selected MEMS optical beam waveguide, optical circuit element, and interconnect features 22-27, 33-38 at a connection interface between the optical backplane die 21 and integrated circuit die 31. As will be appreciated, only portions of the optical backplane die 21 and integrated circuit die 31 at the interface are shown, and each die will also include other optical and/or electrical circuitry (not shown), such as transistors, conductors, and other integrated circuit elements. In the context of the present disclosure, an "optical beam" refers to an unmodulated light beam (directly from a light source, such as a laser, with no signal) or a modulated light beam (carrying a signal), where "light" can refer to any portion of the electromagnetic spectrum, whether visible or not. In addition, a "MEMS optical beam waveguide" refers to a physical structure for directing an optical beam, and includes a MEMS cantilever beam containing an optical waveguide. Though not shown in the final, attached assembly, the integrated circuit die 31 and optical backplane die 21 are oriented perpendicularly from one another, with the integrated circuit die 31 disposed in a horizontal plane, and the optical backplane die 21 disposed in a vertical plane. The relative orientation of the die 21, 31 becomes important insofar as mirror structures formed to deflect optical signals within the plane of the die are relatively easy to fabricate with appropriate pattern and anisotropic etch processes, but mirror structures formed to deflect optical systems outside of the plane of the die are not easy to fabricate.

Referring first to the integrated circuit die 31, one or more optical features are formed over an underlying substrate structure 32 which includes at least a semiconductor substrate layer (not shown), and which is covered by one or more integrated circuit layers 39 (e.g., passivation or dielectric layers and/or other semiconductor or conductor features). For example, a plurality of deflectable MEMS optical beam waveguides 33, 35 (e.g., hundreds per die) may be formed at a connection or side edge of the integrated circuit die 31 to include multiple deflection electrodes positioned on and around each MEMS optical beam waveguide to provide two-dimensional deflection for aligning communications over an optical link 40 between the two die 21, 31. Though the waveguides 33, 35 may be connected to any desired optical elements in the die 31 (such as light detector, modulator, optical receiver, etc.), for purposes of illustration, a waveguide structure 34 is shown as connecting the deflectable MEMS optical beam waveguides 33, 35 with a U-shaped path which includes two in-plane 45-degree mirror surfaces 34a, 34b to provide optical signal deflection points 42, 43 to reverse the direction of the optical signal 40. As will be appreciated, each of the in-plane mirror surfaces 34a, 34b may be fabricated with a relatively straightforward process of forming a mask of photo resist or other masking material (not shown) over a silicon waveguide layer which defines the 45-degree angle features 34a. 34b, and then removing any unprotected portions with an appropriate anisotropic etch process. By covering the in-plane 45-degree angle features 34a, 34b with oxide (e.g., passivation or dielectric layers 39), mirror structures are formed at the interface between the etched silicon and covering oxide layers. In addition or in the alternative, the integrated circuit die 31 may include an optical circuit element 37 (e.g., laser transmitter, light detector, modulator, optical receiver, etc.) which is connected to one or more silicon waveguides 36, 38 for processing and/or conveying optical signal information in the integrated circuit die 31. Again, the silicon waveguides (e.g., 38) may include one or more in-plane mirror surfaces (e.g., 38a) to provide optical signal deflection points for any optical signal conveyed in the waveguide.

The illustrated optical backplane die 21 includes one or more optical backplane mirror structures 22-23, 25-26 and waveguide beams 24, 27 for providing an optical signal path 40-44 in and through the integrated circuit die 31 and optical backplane die 21. As described more fully below, the backplane mirror structures 22-23, 25-26 are formed over an underlying substrate structure 28 which includes at least a semiconductor substrate layer (not shown), and which is covered by one or more integrated circuit layers 29 (e.g., passivation or dielectric layers and/or other semiconductor or conductor features). In addition to including in-plane mirror structures (not shown), the optical backplane die 21 may include a backplane mirror structure 22 to deflect an out-of-plane optical signal 40 into the plane of the optical backplane die 21 at deflection point 44. Though not shown in FIG. 2, it will be appreciated that mirror structures with 45-degree mirror surfaces may also be formed in the integrated circuit die 31 to provide a perpendicular deflection surface into and out of the plane of the integrated circuit die 31. As described more fully below, the mirror structure 22 may be formed with a 45-degree mirror surface 23 by forming a semiconductor layer over the substrate structure 28, and then selectively applying one or more angled silicon etch processes to define an etched silicon feature that may be oxidized to form the reflective oxide mirror structure 22-23. In similar fashion, the optical backplane die 21 may include a backplane mirror structure 25 to deflect an in-plane optical signal 40 perpendicularly out of the plane of the optical backplane die 21 at deflection point 41. For example, the backplane mirror structure 25 may be formed with a 45-degree half-mirror surface 26 by forming an SOI layer over the substrate structure 28, and then selectively applying one or more angled silicon etch processes to define an etched silicon feature that may be partially oxidized to form the half-mirror structure 25-26. When implemented as a half-mirror structure 25-26, optical light information may be also provided to the half-mirror structure 25-26 through an optical beam that is sent through a silicon through-via structure 30 formed in integrated circuit layer(s) 28, 29. As will be appreciated, the silicon through-via structure 30 does not stop at the interface between the integrated circuit layers 28, 29, but may extend through the substrate structure 28, and may also extend through one or more additional die stacked with the optical backplane die 21.

With the depicted backplane mirror structures 22-23, 25-26, an optical signal 40 in the (vertical) plane of the optical backplane die 21 is received in a vertical component of the waveguide beam 27, and is deflected perpendicularly at deflection point 41 by the 45-degree half-mirror surface mirror structure 25-26. The deflected optical signal may then proceed out of the plane of the optical backplane die 21 through a horizontal component of the waveguide beam 27 and to the integrated circuit die 31. After deflection at the U-shaped waveguide path 34 at signal deflection points 42, 43, the optical signal 40 returns to the optical backplane die 21 where it is received in a horizontal component of the waveguide beam 24. At the backplane mirror structures 22-23, the received optical signal 40 is deflected perpendicularly at deflection point 44 by the 45-degree mirror surface 23 of the mirror structure 22, thereby proceeding in the plane of the optical backplane die 21 through a vertical component of the waveguide beam 24.

In addition to routing optical signals between perpendicularly disposed die such as shown in FIG. 2, it will be appreciated that the optical mirror structures disclosed herein may be used to route optical signals between die that are stacked on top of one another, such as by including a first optical mirror structure on a first die that deflects an optical signal up and out of the lateral plane of the first die, and including a second optical mirror structure on a second, stacked die that deflects the deflected optical signal from the first die into the lateral plane of the second die. For additional example details on using mirror structures in various stacked die embodiments, reference is now made to U.S. patent application Ser. No. 13/914,021 (entitled "Die Stack with Optical TSVs" and filed herewith) which is incorporated by reference as if fully set forth herein. Though described with reference to selected arrangements for sharing a single laser source among multiple die, it will be appreciated that the optical mirror structures described in the "Die Stack with Optical TSVs" application can also be used with die stack embodiments.

To illustrate an example fabrication sequence for forming an integrated circuit die with an out-of-plane optical mirror, reference is now made to FIGS. 3-12 which illustrate partial cutaway side views of various stages in the production of an integrated circuit including one or more optical mirrors for transitioning optical signals perpendicularly to the plane of the die. Though the various structures, openings, recesses, and layer regions are illustrated in simplified form with straight lines and corner regions, it will be appreciated that the actual profile(s) for the different structures, openings, recesses, and layer regions will not necessarily conform to simplified depictions, but will instead depend on the specific fabrication process(es) used. For example, selected etch processes may result in curved corner profiles or undercut features. In addition, certain epitaxial or thermal oxidation processes may alter the profile of the resulting layers, depending on a variety of processing factors.

Figure 3:
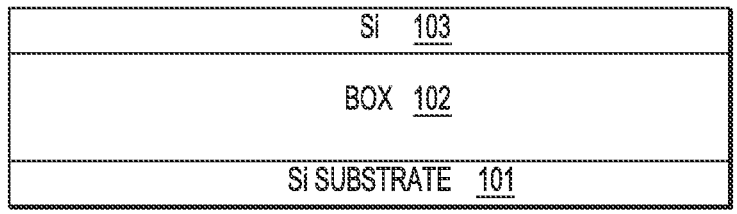
FIGS. 3-12 illustrate partial cutaway side views of various stages in the production of an integrated circuit die including an optical mirror according to a first example embodiment of the present disclosure.

Referring first to FIG. 3, there is shown a partial cutaway side view of a semiconductor wafer structure formed as a starting stack with a plurality of substrate layers 101-103. In selected embodiments, the wafer structure includes a substrate 101 that may be formed with monocrystalline silicon, though other materials may be used for the substrate layer 101. For example, the substrate 101 may be formed as a bulk semiconductor substrate or other substrate in which one or more additional semiconductor layers and/or well regions are formed using epitaxial semiconductor growth and/or selective doping techniques as described more fully hereinbelow. In addition, the substrate 101 may be a semiconductor-on-insulator (SOI) type substrate which includes a semiconductor substrate, buried insulator layer formed over the substrate, and p-type semiconductor substrate layer formed over the buried insulator or oxide layer (not shown). Alternatively, the semiconductor substrate 101 may be implemented as a bulk silicon substrate, single crystalline silicon (doped or undoped), SOI substrate, or any semiconductor material including, for example, Si, SiC, SiGe, SiGeC, Ge, GaAs, InAs, InP, as well as other III/V or II/VI compound semiconductors or any combination thereof.

On the substrate layer 101, an oxide layer or other dielectric material may be formed by depositing or thermally growing one or more silicon oxide layers to form a buried oxide layer having a predetermined thickness (e.g., approximately 1000 nm, though other materials and thicknesses could be used provided that required waveguide properties are obtained. In selected embodiments, the buried oxide layer 102 is a layer of silicon dioxide that is deposited with a chemical vapor deposition (CVD) or thermal deposition over the wafer substrate layer 101, followed by a planarization (e.g., a chemical mechanical polish (CMP)) if required. On the oxide layer 102, a silicon substrate layer 103 is formed. In selected embodiments, the silicon substrate layer 103 may be formed by epitaxially growing monocrystalline silicon or depositing polysilicon using any desired CVD or thermal deposition process to a predetermined thickness (e.g., 1000 nm) which is controlled to define the subsequently formed in-plane optical beam structure. However, in selected embodiments, the substrate layer 103 may be formed with a layer of silicon having a predetermined crystallographic orientation (e.g., <100> or <110>). As will be appreciated, the starting stack of substrate layers 101-103 may be formed as a semiconductor-on-insulator (SOI) substrate wafer structure in which the silicon substrate layer 103 and underlying substrate layer 101 are bonded together to include a buried oxide layer 102. In selected embodiments, holes (not shown) formed in oxide layer 102 and opening to wafer substrate layer 101 may be used to allow wafer substrate layer 101 as a seed layer for epitaxial growth of silicon substrate layer 103.

Figure 4:
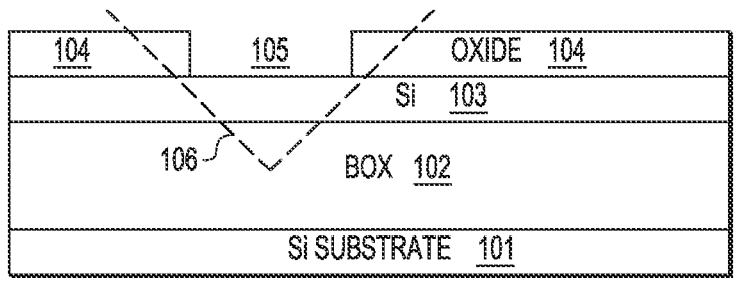

FIG. 4 illustrates processing of the semiconductor wafer structure subsequent to FIG. 3 with a partial cutaway side view after a patterned oxide hardmask 104 is formed over the silicon substrate layer 103. In selected embodiments, the patterned oxide hardmask 104 may be formed on the substrate layer 103 by depositing silicon oxide or another appropriate dielectric material to a predetermined thickness (e.g., 1000 nm) using a CVD or thermal deposition process, alone or in combination with a planarization or polish step. Using a mask of photo resist or other masking material (not shown) formed on the oxide layer 104, one or more portions of the oxide layer 104 may be patterned and etched to form a patterned oxide hardmask 104 to selectively expose the silicon substrate layer 103 with a one or more etched openings 105. For example, the opening(s) 105 may be formed by patterning openings in layer 104 (e.g., using a photolithographic process) and etching the deposited oxide layer 104 with appropriate anisotropic etch chemistries (e.g., $CHF_3$, $C_2F_6$, or $C_4F_8$ and argon gas) for etching silicon dioxide. Other similar mixtures of fluorocarbons (with or without hydrogen) may be used to etch the silicon dioxide. As described more fully hereinbelow, the width and location of the opening(s) 105 in the patterned oxide hardmask 104 are controlled to define a silicon etch opening which will produce the desired angled silicon etch surfaces 106 where the deflection surfaces of the optical mirror structures are finally formed.

Figure 5:
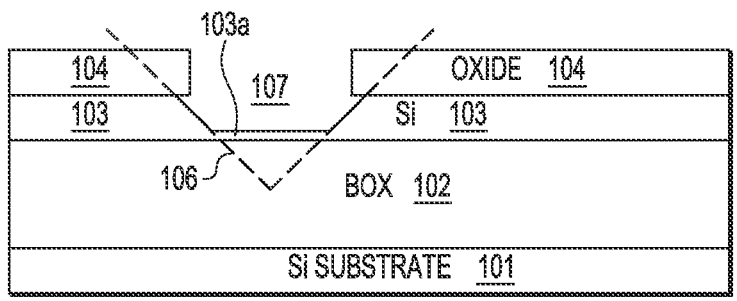

FIG. 5 illustrates processing of the semiconductor wafer structure subsequent to FIG. 4 with a partial plan view after portions of the silicon substrate layer 103 have been directionally etched to form one or more etched silicon openings 107 with angled sidewalls or etch surfaces 106 where the deflection surfaces of the optical mirror structures are finally formed. By exploiting the crystallographic orientation of the silicon substrate layer 103, a selectively oriented silicon wet etch or dry etch process may be applied to form the silicon etch opening 107 which will produce the desired angled silicon etch surfaces. For example, the exposed silicon substrate layer 103 can be etched in a controlled fashion with a silicon orientation-dependent wet etch process to produce well-defined V-grooves 107 having 45 degree surfaces. Example wet anisotropic etch processing details are shown in C. Strandman et al., "Fabrication of 45° Mirrors Together with Well-Defined V-Grooves Using Wet Anisotropic Etching of Silicon," J. Microelectromechanical Systems, Vol. 4, No. 4, pp. 213-219 (December 1995), which is incorporated by reference as if fully set forth herein. Several anisotropic wet etchants are available for anisotropic silicon etching, all of them hot aqueous caustics. For instance, potassium hydroxide (KOH) displays an etch rate selectivity 400 times higher in <100> crystal directions than in <111> directions. In addition, an aqueous solution of ethylene diamine and pyrocatechol (EDP) displays a <100>/<111> selectivity of 17× without etching silicon dioxide while also displaying high selectivity between lightly doped and heavily boron-doped (p-type) silicon. Tetramethylammonium hydroxide (TMAH) presents a safer alternative than EDP, with a 37× selectivity between {100} and {111} planes in silicon. Other angled silicon etch processes include Hydrazine ($N_2H_4$) and Cesium hydroxide (CsOH), etc. These etch techniques may be used to reveal {100} planes on a <111> silicon substrate layer 103. While the applied silicon etch process may etch completely through the silicon substrate layer 103 to expose the underlying buried oxide layer 102, in other embodiments, the silicon etch process may be applied as a timed etch process to leave a thin layer of silicon 103a at the bottom of the etched silicon opening(s) 107 for subsequent use as a seed layer for an subsequently formed epitaxial silicon layer.

Figure 6:
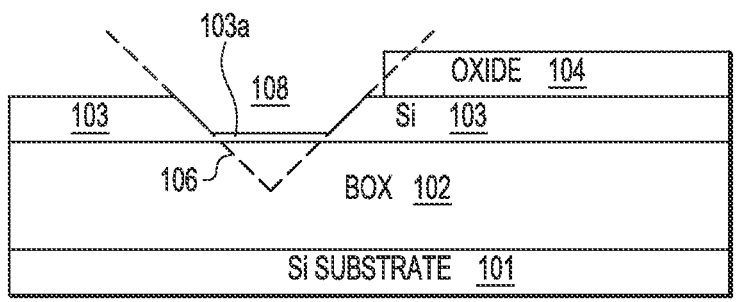

FIG. 6 illustrates processing of the semiconductor wafer structure subsequent to FIG. 5 with the partial cutaway side view after part of the of the patterned oxide hardmask 104 has been selectively removed to form an opening 108 over the region of the silicon substrate layer 103 behind the intended optical mirror region. For example, an etch mask (not shown) may be selectively formed over the wafer structure to protect the intended waveguide beam structure portion of the silicon substrate layer 103. With the etch mask in place, an oxide etch process may be applied to remove the exposed portion of the patterned oxide hardmask 104 and expose the silicon substrate layer 103 behind the intended optical mirror region without substantially etching the exposed silicon substrate layers 103, 103a. While any desired oxide etch process (e.g., $CHF_3$, $C_2F_6$, $C_4F_8$ and argon gas, or similar mixtures of fluorocarbons, with or without hydrogen) may be used to selectively remove part of the of the patterned oxide hardmask 104, the etch process should be controlled to retain the angled sidewalls or etch surfaces 106 of the etched silicon substrate layer 103. While the process of removing part of the patterned oxide hardmask 104 on the left side of the opening 108 may also remove a portion of the patterned oxide hardmask 104 on the right side of the opening 108 as shown in FIG. 6, it will be appreciated that it is not required to control the precise location of the patterned oxide hardmask 104 on the right side of the opening 108, other than to assist with protecting the patterned oxide hardmask 104 on the right side of the opening 108 from the subsequent oxidation processing steps. It will also be appreciated that the thin layer of silicon 103a protects the underlying buried oxide layer 102 from being removed during the oxide etch process.

Figure 7:
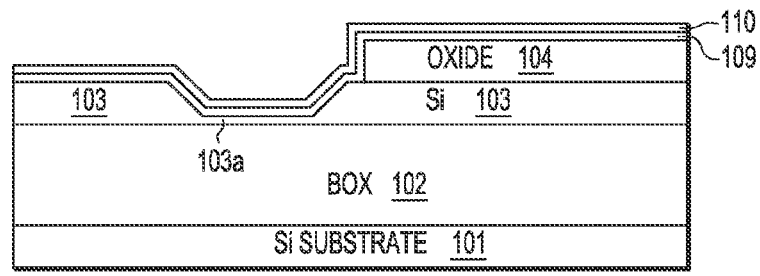

FIG. 7 illustrates processing of the semiconductor wafer structure subsequent to FIG. 6 with the partial cutaway side view after a LOCal Oxidation of Silicon (LOCOS) protection stack 109-110 is formed on the semiconductor wafer structure. In selected embodiments, the LOCOS protection stack 109-110 is formed by first depositing a thin oxide layer or pad oxide layer 109 to a predetermined thickness (e.g., approximately 1-50 nm), though other materials and thicknesses could be used. On the oxide layer 109, a silicon nitride layer 110 is formed to a predetermined thickness (e.g., approximately 30-50 nm), such as by using CVD or thermal deposition process. As will be appreciated, the LOCOS protection stack 109-110 may be formed with other materials or layers to protect any covered portion of the silicon substrate layer 103 from oxidation.

Figure 8:
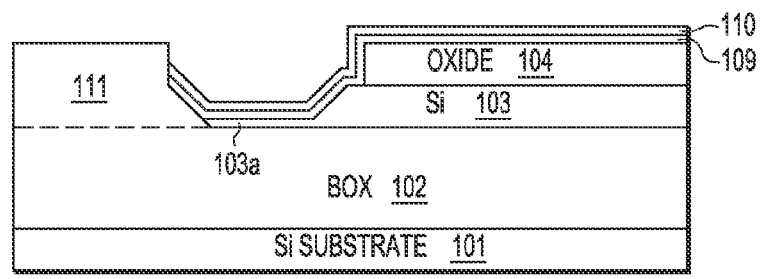

FIG. 8 illustrates processing of the semiconductor wafer structure subsequent to FIG. 7 with the partial cutaway side view after the LOCOS protection stack 109-110 is patterned and etched, and a LOCOS layer 111 is formed by oxidizing the exposed region of the silicon substrate layer 103 behind the intended optical mirror region. While any desired pattern and etch process may be used to pattern and etch the LOCOS protection stack 109-110, a photoresist mask or other masking material (not shown) may be used to pattern, develop, and etch the protection stack 109-110 to protect the intended waveguide beam structure portion of the silicon substrate layer 103 as well as the angled sidewalls or etch surfaces 106 of the etched silicon substrate layer 103. With the patterned LOCOS protection stack 109-110 in place, the wafer structure may be cleaned, followed by a selective oxide growth process, such as LOCOS micro-fabrication process. In accordance with conventional LOCOS processes, following cleaning and surface preparation, a thermal field oxidation process is performed to produce an oxide layer 111 on an exposed top surface of the silicon substrate layer 103. In selected embodiments, the selective oxide growth process is controlled to convert the angled sidewalls/surfaces 106 of the etched silicon substrate layer 103 into angled sidewalls/surfaces 106 of the LOCOS layer 111 which will subsequently serve as the mirror surfaces of the optical mirror structure. The selective oxide growth process may also be controlled to preserve the angled structure under the layers 109, 110, to encourage uniform oxide formation deeper into the exposed silicon layer, and to prevent bird's beak encroachment into the thin silicon layer 103a. In other embodiments, the formation of the oxide layer 111 may include patterned oxygen implants to provide oxygen into deeper portions of the silicon to promote uniform oxide formation. Though not required, the selective oxide growth process may be controlled to form the LOCOS layer 111 to be substantially co-planar with the remaining patterned oxide hardmask 104, though planarization is not required at this stage of the fabrication process. In selected embodiments, the angle of angled sidewalls or etch surfaces 106 may be modified during the etch process to compensate for the effects of the LOCOS process on angled sidewalls/surfaces 106 of the LOCOS layer 111.

Figure 9:
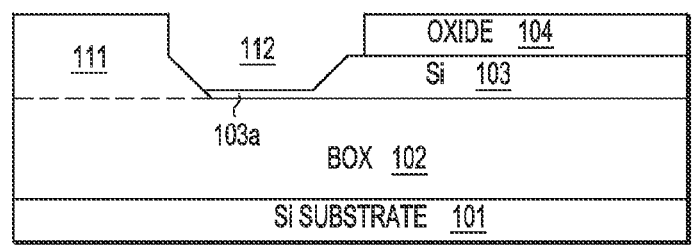

FIG. 9 illustrates processing of the semiconductor wafer structure subsequent to FIG. 8 with the partial cutaway side view after the LOCOS protection stack 109-110 is removed from the semiconductor wafer structure. While any desired film removal process may be used, in selected embodiments, the nitride layer 110 may be removed by using a hot phosphoric acid process, and the oxide layer 109 may be removed by using a dilute HF wet etch process. Once the layers of the LOCOS protection stack 109-110 are removed, there is defined a mirror structure opening 112 between the LOCOS layer 111 and the remaining patterned oxide hardmask 104 and underlying etched silicon substrate layer 103. As shown, the mirror structure opening 112 includes a first angled sidewall/surface of the LOCOS layer 111, a bottom surface of the thin silicon layer 103a, and second angled sidewall/surface of the etched silicon substrate layer 103.

Figure 10:
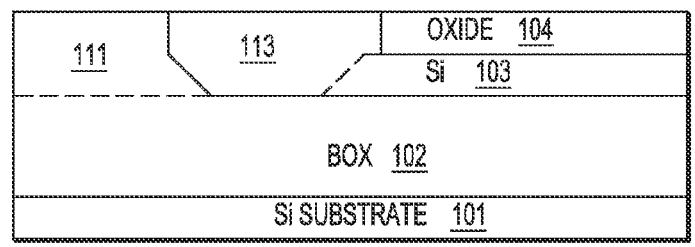

FIG. 10 illustrates processing of the semiconductor wafer structure subsequent to FIG. 9 with the partial cutaway side view after a semiconductor layer 113 is selectively formed in the mirror structure opening 112. While any desired semiconductor formation process may be used, in selected embodiments, the semiconductor layer 113 is selectively formed in the mirror structure opening 112 using an epitaxial silicon growth process. For example, using the thin silicon layer 103a as a seed layer, the semiconductor layer 113 may be selectively formed in the opening 112 without also covering the oxide layers 111, 104 by using a selective epitaxial growth of a silicon layer 113 which may be achieved by a process of chemical vapor deposition (CVD) at a chamber temperature between 400 and 900° C. in the presence of dichlorosilane, HCl, and hydrogen gas. As described herein and understood by those skilled in the art, the process of forming an epitaxial layer 113 may be described as growing an epitaxial layer, though sometimes the term "deposition" is loosely used to refer to the formation of the epitaxial layer. By selectively forming the epitaxial semiconductor layer 113 from the thin silicon seed layer 103a or remaining unetched silicon substrate layer 103, the semiconductor layer 113 has the same crystallographic orientation as the silicon substrate layer 103 used to form the waveguide beam structure. To remove any overgrowth of the epitaxial semiconductor layer 113, a planarization or CMP polish step may be applied to planarized the LOCOS layer 111, epitaxial semiconductor layer 113 and remaining patterned oxide hardmask 104.

At this point in the fabrication process, an integrated optical mirror structure is formed with the polished epi semiconductor layer 113 at the interface of the first angled sidewall/surface of the LOCOS layer 111 and the epitaxial semiconductor layer 113. At this interface, optical signal information transmitted through the waveguide beam structure formed by the silicon substrate layer 103 (and within the lateral plane of the semiconductor wafer structure) is deflected perpendicularly to the lateral plane of the semiconductor wafer structure to proceed through the opening of the polished epi semiconductor layer 113, and vice versa. However, given the width of the polished epi semiconductor layer 113, received optical signals should be properly aligned with the mirror interface surface 111/113. To assist with alignment of received optical signals, the size of the opening may be tuned or reduced to promote signal alignment.

Figure 11:
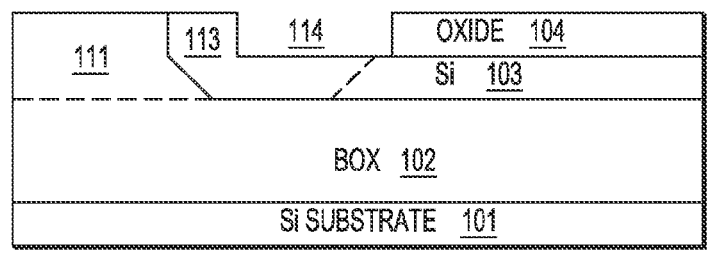

To illustrate an example technique for tuning the size of the optical mirror structure formed with the polished epi semiconductor layer 113, reference is now made to FIG. 11 illustrates processing of the semiconductor wafer structure subsequent to FIG. 10 with the partial cutaway side view after forming a recess opening 114 by selectively removing a portion of the polished epi semiconductor layer 113 remote from the mirror interface surface 111/113. In selected embodiments, the recess opening 114 is formed to a depth so that the bottom of recess 114 is coplanar with the top of the remaining etched silicon substrate layer 103. And while any desired selective removal process may be used, in selected embodiments, the recess opening 114 may be formed by patterning a mask of photo resist or other masking material (not shown) to protect the portion of the polished epi semiconductor layer 113 over the mirror interface surface 111/113 and expose the portion of epi layer 113 that is remote from the mirror interface surface 111/113. The unmasked epi layer 113 are removed by etching with appropriate etch chemistries, such as an anisotropic timed etch that is selective with respect to the masking material. For example, a chlorine containing etch chemistry or more generally a halogen containing etch chemistry maybe used, but other etch chemistries for etching silicon may be used.

Figure 12:
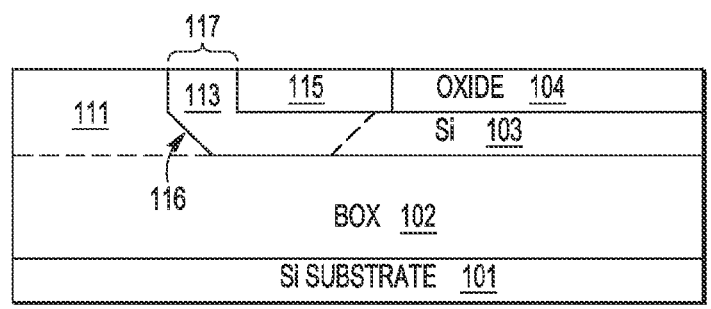

FIG. 12 illustrates processing of the semiconductor wafer structure subsequent to FIG. 11 with the partial cutaway side view after a dielectric layer 115 is formed in the recess opening 114. In selected embodiments, the dielectric layer 115 is formed by depositing silicon dioxide with a CVD or thermal deposition process at a sufficient thickness to fill the recess opening, followed by a planarization or CMP of the wafer structure. As a consequence of the foregoing fabrication sequence, an integrated optical mirror structure is formed with the polished epi semiconductor layer 113 having a reduced or tuned opening 117 above the mirror interface surface 111/113. Through this opening 117, optical signal information that is received through the opening 117 in a perpendicular transmission path (to the lateral plane of the semiconductor wafer structure) is deflected perpendicularly into the lateral plane of the semiconductor wafer structure to proceed through the waveguide beam structure formed by the silicon substrate layer 103 (and within the lateral plane of the semiconductor wafer structure).

As will be appreciated, it may be possible to eliminate the processing steps for tuning the size of the optical mirror structure (described in FIGS. 11-12) by limiting the width of the opening 105 in the patterned oxide hardmask 104 (and the resulting width of the silicon etch opening 107). In this scenario, the epi layer 113 formed in the silicon etch opening 112 provides adequate alignment to the mirror interface surface 111/113 without additional processing to tune its width.

To illustrate another example fabrication sequence for forming an integrated circuit die with out-of-plane optical mirrors, reference is now made to FIGS. 13-20 which illustrate partial cutaway side views of various stages in the production of an integrated circuit die with one or more optical mirrors for transitioning optical signals perpendicularly to the plane of the integrated circuit die. Generally speaking, FIGS. 13-20 illustrate a similar processing sequence to that shown in FIGS. 3-12, but instead of forming a LOCOS layer from an exposed silicon substrate layer, the exposed silicon substrate layer is only partially oxidized to form the half-mirror structure.

Figure 13:
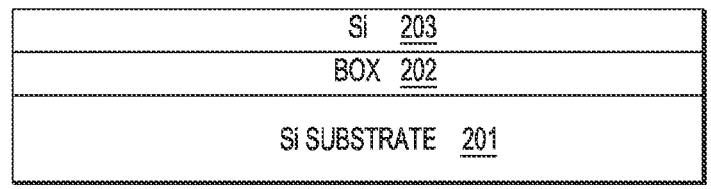
FIGS. 13-20 illustrate partial cutaway side views of various stages in the production of an integrated circuit die including an optical mirror according to a second example embodiment of the present disclosure.

Referring first to FIG. 13, there is shown a partial cutaway side view of a semiconductor wafer structure formed as a starting stack with a plurality of substrate layers 201-203. In selected embodiments, the wafer structure includes a bulk silicon substrate 201 formed with monocrystalline silicon, though other materials may be used. On the substrate layer 201, a buried oxide or dielectric layer 202 may be formed by depositing and/or thermally growing silicon oxide to a predetermined thickness, though other materials and thicknesses could be used. On the buried oxide layer 202, a semiconductor substrate layer 203 is formed. In selected embodiments, the semiconductor substrate layer 203 may be formed by epitaxially growing monocrystalline silicon or depositing polysilicon using any desired CVD or thermal deposition process, alone or in combination with a planarization or polish step. When formed as monocrystalline silicon, the silicon substrate layer 203 may have a predetermined crystallographic orientation (e.g., <100> or <110>) that is formed to a predetermined thickness (e.g., 1000 nm) which is controlled to define the subsequently formed waveguide beam structure for conveying optical signal in the plane of the wafer substrate.

Figure 14:
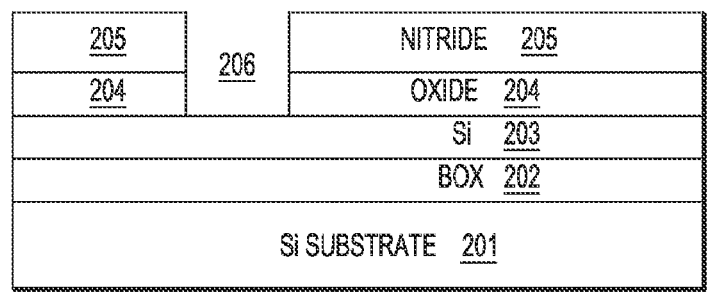

FIG. 14 illustrates processing of the semiconductor wafer structure subsequent to FIG. 13 with the partial cutaway side view after a patterned etch mask 204-205 is formed on the semiconductor wafer structure using a trench etch process to expose the buried oxide layer 202. In selected embodiments, the patterned etch mask 204-205 is formed by first depositing an oxide layer 204 to a predetermined thickness (e.g., approximately 1000 nm), though other materials and thicknesses could be used, provided that sufficient waveguide performance requirements are met. On the oxide layer 204, a silicon nitride layer 205 is formed to a predetermined thickness (e.g., 30-100 nm), such as by using CVD or thermal deposition process. Of course, the etch mask layers 204-205 may be formed with other materials or layers. However formed, the etch mask layers 204-205 are then patterned and trench etched with one or more anisotropic etch processes to define an opening 206 which exposes the underlying semiconductor substrate layer 203 over the intended optical mirror region. While any desired pattern and trench etch process may be used, a photoresist mask or other masking material (not shown) may be used to pattern, develop, and etch the etch mask 204-205 to form the trench opening 206 and to protect the intended waveguide beam structure portions of the silicon substrate layer 203. As described herein, the width and location of the trench opening(s) 206 in the patterned etch mask 204-205 are controlled to define a silicon etch opening which will produce the desired angled silicon etch surfaces where the deflection surfaces of the mirror structures are finally formed.

Figure 15:
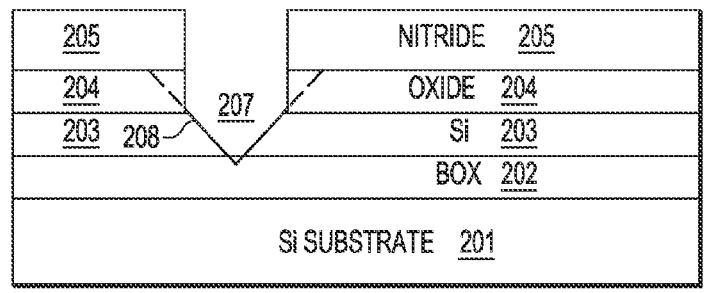

FIG. 15 illustrates processing of the semiconductor wafer structure subsequent to FIG. 14 with a partial plan view after portions of the silicon substrate layer 203 have been directionally etched to form one or more etched silicon openings 207 with angled sidewalls or etch surfaces 208 where the deflection surfaces of the mirror structures are finally formed. The directional etching may apply a selectively oriented silicon wet etch or dry etch process that exploits the crystallographic orientation of the silicon substrate layer 203, thereby forming the silicon etch opening 207 which will produce the desired angled silicon etch surfaces. Examples of silicon orientation-dependent wet etch process that can produce well-defined V-grooves 207 having 45 degree surfaces include various anisotropic wet etchants, such as KOH, EDP, TMAH, $N_2H_4$, or CsOH wet etch processes.

Figure 16:
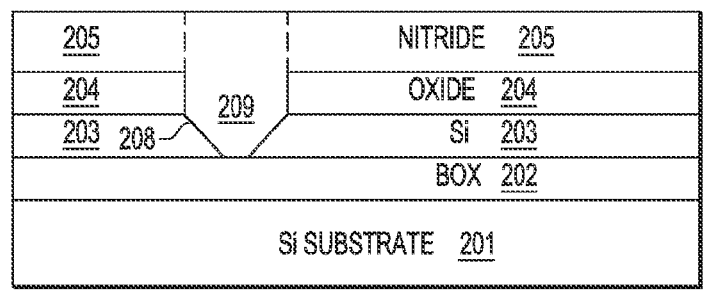

FIG. 16 illustrates processing of the semiconductor wafer structure subsequent to FIG. 15 with the partial cutaway side view after a dielectric fill layer 209 is formed in the etched silicon opening(s) 207. In selected embodiments, the dielectric layer 209 is formed by depositing silicon nitride with a CVD or thermal deposition process at a sufficient thickness to fill the etched silicon opening(s) 207, followed by a planarization or CMP of the wafer structure. As a consequence of the dielectric fill sequence, both angled silicon etch surfaces of the etched semiconductor substrate layer 203 are covered and protected by the dielectric fill material 209. In selected embodiments, a very thin pad oxide may be deposited to a predetermined thickness (e.g., approximately 1-5 nm) before the silicon nitride to facilitate proper adhesion. However, the oxide should be selected so that its removal during subsequent process steps does not hinder the optical mirror structures.

Figure 17:
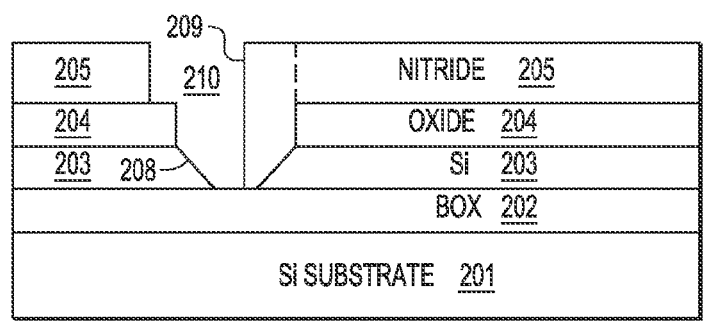

FIG. 17 illustrates processing of the semiconductor wafer structure subsequent to FIG. 16 with the partial cutaway side view after a portion of at least the dielectric fill material 209 (and possibly part of the nitride layer 205) is removed to expose at least one of the angled silicon etch surfaces 208 of the etched semiconductor substrate layer 203. While any desired pattern and etch process may be used to pattern and etch the dielectric fill material 209, a photoresist mask or other masking material (not shown) may be used to pattern, develop, and etch the dielectric fill material 209 to form an opening 210 that exposes one or more of the angled sidewalls or etch surfaces 208 of the etched silicon substrate layer 203 in the intended optical mirror region. And while only a single angled silicon etch surfaces 208 is shown as being exposed, it will be appreciated that both of the angled silicon etch surfaces can be exposed by the opening 210 in embodiments where two half mirror structures are being formed.

Figure 18:
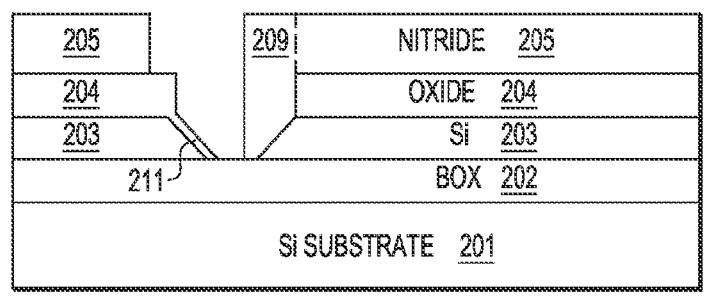

FIG. 18 illustrates processing of the semiconductor wafer structure subsequent to FIG. 17 with the partial cutaway side view after an oxide layer 211 is formed on the exposed angled silicon etch surface 208. In selected embodiments, the oxide layer 211 may be deposited or thermally grown to convert the exposed surface of the angled silicon etch surface 208 into silicon dioxide having a predetermined thickness (e.g., approximately 10-500 Angstroms) that is suitable for forming a half-mirror structure while otherwise retaining the remainder of the etched semiconductor substrate layer 203. However, it will be appreciated that the oxide layer 211 may be formed with any desired technique used, such as chemical vapor deposition (CVD) techniques, physical vapor deposition (PVD) techniques, atomic layer deposition (ALD) techniques, or any other technique for depositing or growing an oxide layer 211. In selected embodiments, a multilayer structure of overlapping silicon oxide and silicon layers may be used to form the half-mirror structure. In other selected embodiments, other materials and thicknesses may be used to construct the multilayer structure.

Figure 19:
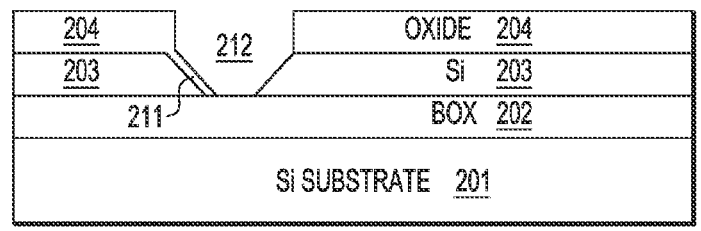

FIG. 19 illustrates processing of the semiconductor wafer structure subsequent to FIG. 18 with the partial cutaway side view after the remaining dielectric fill material 209 and nitride layer 205 are removed from the semiconductor wafer structure. While any desired film removal process may be used, in selected embodiments, the nitride layers 205, 209 may be removed by using a hot phosphoric acid process. If desired, a planarization or CMP process may be applied to planarize the exposed oxide hardmask layers 204. Once the nitride layers 205, 209 are removed (and polished), there is defined a mirror structure opening 212 between the remaining patterned oxide hardmask 204, oxide layer 211, and underlying etched silicon substrate layers 203. As shown, the mirror structure opening 212 includes a first angled sidewall/surface formed with the oxide layer 211, a bottom surface of the buried oxide 202, and second angled sidewall/surface of the etched silicon substrate layer 203.

Figure 20:
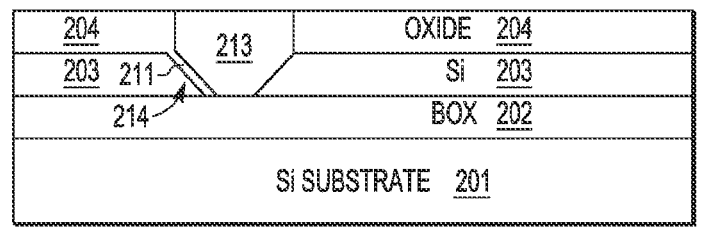

FIG. 20 illustrates processing of the semiconductor wafer structure subsequent to FIG. 19 with the partial cutaway side view after a semiconductor layer 213 is selectively formed in the mirror structure opening 212. While any desired semiconductor formation process may be used, in selected embodiments, the semiconductor layer 213 is selectively formed by epitaxially growing silicon in the mirror structure opening 212, such as by using a selective epitaxial growth of a silicon layer 213 from the exposed second angled sidewall/surface of the etched silicon substrate layer 203 second angled sidewall/surface of the etched silicon substrate layer 203. By selectively forming the epitaxial semiconductor layer 213 from the etched silicon substrate layer 203, the semiconductor layer 213 has the same crystallographic orientation as the silicon substrate layer 203 used to form the waveguide beam structure. To remove any overgrowth of the epitaxial semiconductor layer 213, a planarization or CMP polish step may be applied to the wafer structure. The half-mirror structure 214 allows light in the waveguide formed in epitaxial semiconductor layer 213 to be deflected perpendicularly into the lateral plane of the semiconductor wafer structure to proceed through the waveguide beam structure formed by the silicon substrate layer 203. The half-mirror structure 214 also allows the portion of the light not deflected to remain with the waveguide beam structure formed by the silicon substrate layer 203.

To illustrate another example fabrication sequence for forming an integrated circuit die with out-of-plane optical mirrors, reference is now made to FIGS. 21-31 which illustrate partial cutaway side views of various stages in the production of an integrated circuit die including one or more optical through-silicon via half-mirror structures for transitioning optical signals perpendicularly to the plane of the integrated circuit die. Generally speaking, the processing sequence shown in FIGS. 21-31 forms a half-mirror structure over a through-silicon via (TSV) by forming one or more half-mirror layers over an angled interface of the TSV to form a combination half-mirror for both the optical TSV and lateral waveguide beam structures.

Figure 21:
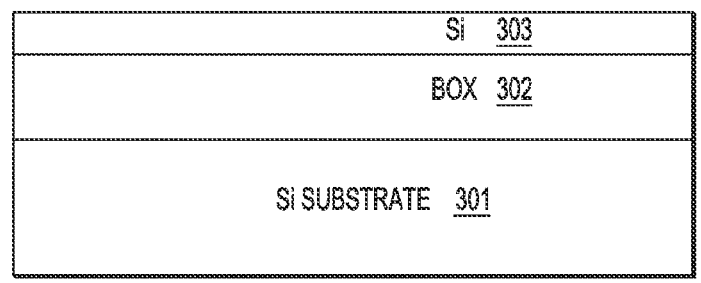
FIGS. 21-31 illustrate partial cutaway side views of various stages in the production of an integrated circuit die including an optical through silicon via with half mirror according to a third example embodiment of the present disclosure.

Referring first to FIG. 21, there is shown a partial cutaway side view of a semiconductor wafer structure formed as a starting stack with a plurality of substrate layers 301-303. While a bulk silicon substrate 301 may be formed with monocrystalline silicon, other materials may be used. On the substrate layer 301, a buried oxide or dielectric layer 302 having a predetermined thickness may be formed with silicon oxide, though any desired materials or thickness could be used. On the buried oxide layer 302, a semiconductor substrate layer 303 is formed, such as by epitaxially growing monocrystalline silicon or depositing polysilicon using any desired CVD or thermal deposition process, alone or in combination with a planarization or polish step. When formed as monocrystalline silicon, the silicon substrate layer 303 may have a predetermined crystallographic orientation (e.g., <100> or <110>) that is formed to a predetermined thickness which is controlled to define the subsequently formed waveguide beam structure for conveying optical signal in the plane of the wafer substrate. As will be appreciated, the semiconductor wafer structure may be a semiconductor-on-insulator (SOI) type substrate which includes a semiconductor substrate 301, buried insulator layer 302 formed over the substrate, and p-type semiconductor substrate layer 303 formed over the buried insulator or oxide layer 302.

Figure 22:
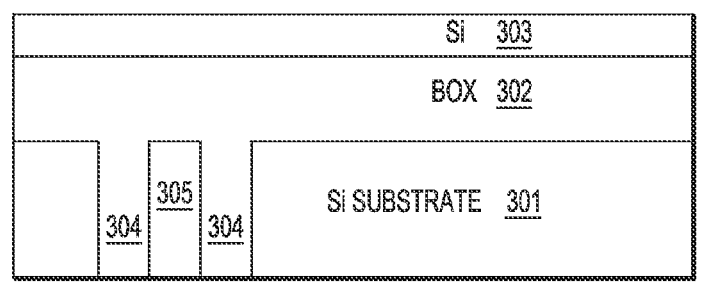

FIG. 22 illustrates processing of the semiconductor wafer structure subsequent to FIG. 21 with the partial cutaway side view after one or more backside optical TSV structures 305. In selected embodiments, the optical TSV structure 305 may be formed with a backside TSV process which forms a cylindrical oxide region 304 on the backside of the wafer structure extending to the buried oxide layer 302. In the embodiment shown, the optical TSV structure 305 is formed by patterning and via etching a hollow cylinder-shaped opening through the backside of the wafer structure (e.g., by a photolithographic processes) using an anisotropic etch chemistry that etches the substrate layer 301 through to the buried oxide layer 302. The cylinder-shaped opening is then filled with a dielectric or oxide material, such as by depositing silicon dioxide with a CVD or thermal deposition process at a sufficient thickness to fill the cylinder-shaped opening, followed by a planarization or CMP of the wafer structure. The resulting cylindrical oxide region 304 surrounds and devices an optical TSV structure 305 extending from the bottom of the semiconductor substrate 301. As will be appreciated, other backside TSV processes can be used to form the optical TSV structure 305, such as epitaxially growing the optical TSV structure 305 in an etched opening of a deep trench oxide formed in the semiconductor substrate 301.

Figure 23:
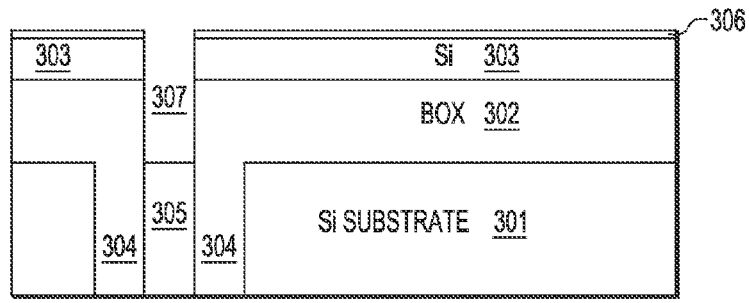

FIG. 23 illustrates processing of the semiconductor wafer structure subsequent to FIG. 22 with a partial cutaway side view after a patterned hardmask 306 is formed and portions of the silicon substrate layer 303 and buried oxide layer 304 have been anisotropically etched to form one or more etched openings 307 to expose the optical TSV structure 305. While any desired pattern and etch process may be used, the etched opening(s) 307 may be formed by depositing silicon oxide or other appropriate hardmask material(s) on the substrate layer 303 to a predetermined thickness, using a mask of photo resist or other masking material (not shown) to develop the patterned hardmask layer 306, and then applying one or more anisotropic etch processes using the patterned hardmask layer 306 as an etch mask to form one or more openings 307 in the silicon substrate layer 303 and buried oxide layer 304. The width and location of the opening(s) 307 are controlled to expose the previously formed optical TSV structure(s) 305.

Figure 24:
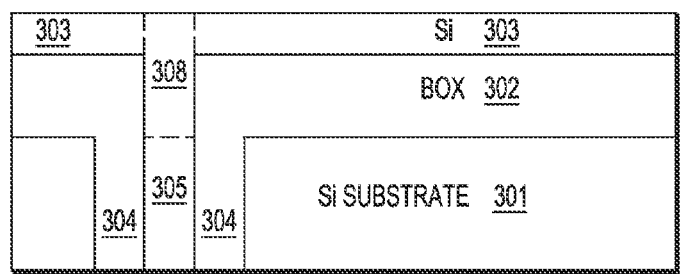

FIG. 24 illustrates processing of the semiconductor wafer structure subsequent to FIG. 23 with the partial cutaway side view after a semiconductor layer 308 is selectively formed to fill the etched opening(s) 307 and complete the optical TSV structure. As disclosed herein, the semiconductor layer 308 may be selectively formed in the etched opening(s) 307 using an epitaxial silicon growth process, though any desired semiconductor formation process may be used. By using the optical TSV structure 305 as the seed layer for a selective epitaxial growth process, the semiconductor layer 308 may be selectively formed in the opening 307 without also covering the semiconductor substrate layers 303, thereby forming an epitaxial semiconductor layer 308 having the same crystallographic orientation as the optical TSV structure 305. To remove any overgrowth of the epitaxial semiconductor layer 308 and the patterned hardmask 306, a planarization or CMP polish step may be applied to the wafer substrate.

Figure 25:
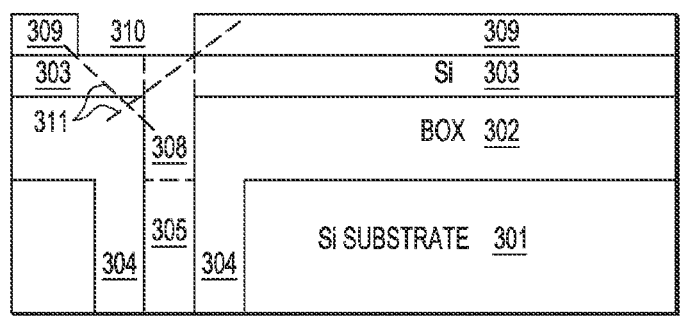

FIG. 25 illustrates processing of the semiconductor wafer structure subsequent to FIG. 24 with a partial cutaway side view after a patterned oxide hardmask 309 is formed over the silicon substrate layer 303. As disclosed herein, the patterned oxide hardmask 309 may be formed by growing and/or depositing silicon oxide or another appropriate dielectric material on the silicon substrate layer 303 to a predetermined thickness using any desired oxide formation process, alone or in combination with a planarization or polish step. Using a mask of photo resist or other masking material (not shown), one or more portions of the oxide hardmask layer 309 may be patterned and etched to form the patterned oxide hardmask 309 with one or more etched openings 310. As disclosed herein, the width and location of the opening(s) 310 in the patterned oxide hardmask 309 are controlled to expose at least part of the silicon substrate layer 303 (which will serve as an epitaxial growth seed layer) and to expose the top of the semiconductor layer 308 from the optical TSV structure. In addition, the width and location of the opening(s) 310 are controlled to define a silicon etch opening which will produce the desired angled silicon etch surfaces 311 to provide deflection surfaces of the subsequently formed mirror structures.

Figure 26:
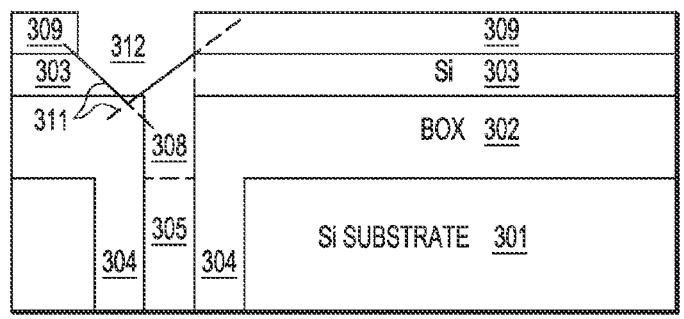

FIG. 26 illustrates processing of the semiconductor wafer structure subsequent to FIG. 25 with a partial plan view after portions of the silicon substrate layer 303 and epi semiconductor layer 308 have been directionally etched to form one or more etched silicon openings 312 with angled sidewalls or etch surfaces 311 where the deflection surfaces of the mirror structures are finally formed. The directional etching may apply a selectively oriented silicon wet etch or dry etch process that exploits the crystallographic orientation (e.g., of the silicon layers 308, 303, thereby forming the silicon etch opening 310 which will produce the desired angled silicon etch surfaces. Examples of silicon orientation-dependent wet etch process that can produce well-defined V-grooves 310 having 45 degree surfaces include various anisotropic wet etchants, such as KOH, EDP, TMAH, $N_2H_4$, or CsOH wet etch processes. These etch techniques may be used to reveal {100} planes on a <111> silicon layer 308. While the applied silicon etch process may etch only partially through the silicon substrate layer 303 without exposing the underlying buried oxide layer 302, in other embodiments, the silicon etch process may be applied as a timed etch process to position the angled silicon etch surface of the silicon layer 308 to intersect with the top of the buried oxide layer 302 for improved positioning of the subsequently formed optical TSV half-mirror structure(s).

Figure 27:
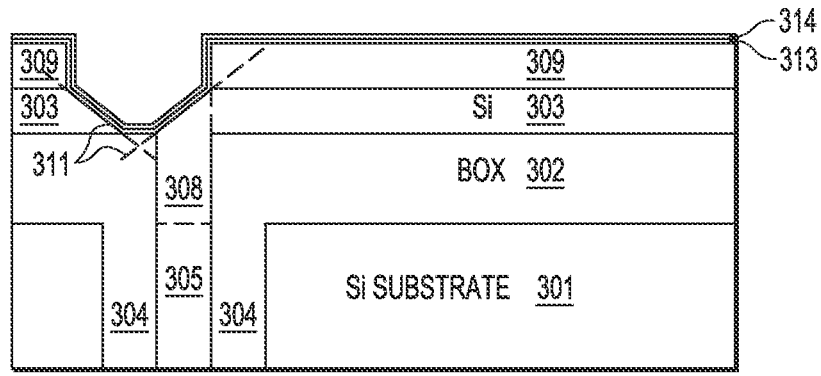

FIG. 27 illustrates processing of the semiconductor wafer structure subsequent to FIG. 26 with the partial cutaway side view after one or more dielectric mirror layers 313-314 are formed on the semiconductor wafer structure. In selected embodiments, the dielectric mirror layer stack 313-314 is formed over the patterned oxide hardmask 309 and in the etched silicon opening(s) 312 by first depositing a thin oxide layer or pad oxide layer 313 to a predetermined thickness on the semiconductor wafer structure. On the oxide layer 313, a silicon nitride layer 314 is formed to a predetermined thickness by using CVD or PVD process. As will be appreciated, the dielectric mirror layer stack 313-314 may be formed with other materials or layers to protect any covered silicon layers from epitaxial growth processing. In addition, the materials used to form the dielectric mirror layer stack 313-314 should have suitable light deflection properties required for a half-mirror structure.

As an alternative to forming the dielectric mirror layer stack 313-314, a thermal oxide growth process may be performed to produce an oxide layer on at least the angled silicon etch surface of the silicon layer 308. In these embodiments, the thermally grown oxide layer formed on the exposed surface of the angled silicon etch surface 308 has a predetermined thickness (e.g., approximately 10-500 Angstroms) that is suitable for forming a half-mirror structure. In other embodiments, a full mirror structure may be formed by forming one or more dielectric mirror stack layers 313-314 to a sufficient thickness on the angled silicon etch surface 308 to fully reflect any optical signal from the optical TSV structure 305, 308 to the silicon substrate layer 303 on the right side, and vice versa.

Figure 28:
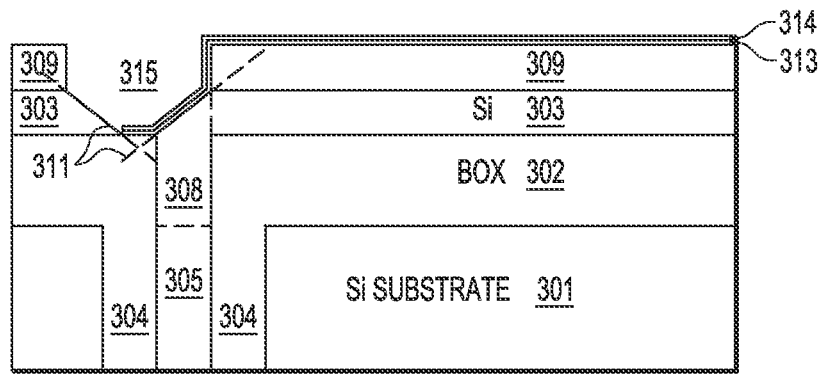

FIG. 28 illustrates processing of the semiconductor wafer structure subsequent to FIG. 27 with the partial cutaway side view after the dielectric mirror layer stack 313-314 is patterned and etched to form an opening 315 which exposes part of the silicon substrate layer 303 for use as an epitaxial growth seed layer while retaining the dielectric mirror layer(s) 313-314 over the angled silicon etch surface 308. While any desired pattern and etch process may be used to form the opening 315, a photoresist mask or other masking material (not shown) may be used to pattern, develop, and etch the dielectric mirror layer stack 313-314 to expose the angled sidewalls or etch surfaces 311 of the etched silicon substrate layer 303.

Figure 29:
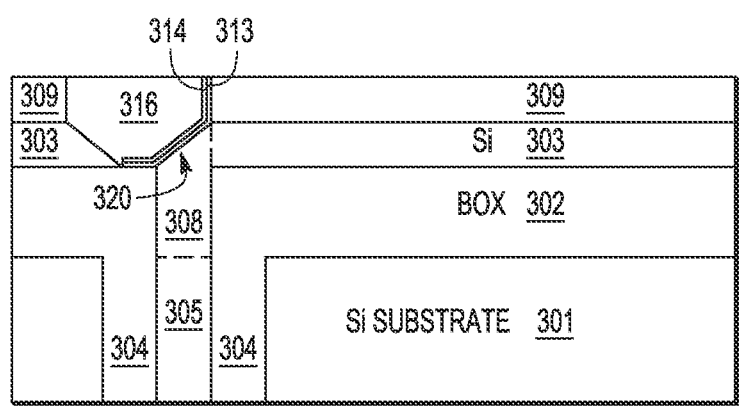

FIG. 29 illustrates processing of the semiconductor wafer structure subsequent to FIG. 28 with the partial cutaway side view after a semiconductor layer 316 is selectively formed to fill the etched opening(s) 315 and cover the patterned dielectric mirror layer(s) 313-314 formed over the optical TSV structure. As disclosed herein, the semiconductor layer 316 may be selectively formed using an epitaxial silicon growth process, though any desired semiconductor formation process may be used. By using the patterned dielectric mirror layer(s) 313-314 to prevent epitaxial growth from the epi semiconductor layer 308, the retained patterned dielectric mirror layer(s) 313-314 cover the optical TSV structure 305, 308 with one or more dielectric layers that are suitable for forming a half-mirror structure. To remove any overgrowth of the epitaxial semiconductor layer 316 on the patterned hardmask 309, a planarization or CMP polish step may be applied to the wafer substrate.

At this point in the fabrication process, an integrated optical half-mirror structure 320 is formed with the patterned dielectric mirror layer(s) 313-314 at the interface of the angled silicon etch surface 308 and the epitaxial semiconductor layer 316. At this interface, optical signal information transmitted through the waveguide beam structure formed by the silicon substrate layer 303 (and within the lateral plane of the semiconductor wafer structure) is deflected by the half-mirror structure 320 to proceed perpendicularly to the lateral plane of the semiconductor wafer structure and through the opening of the polished epi semiconductor layer 316. In addition, optical signal information transmitted through the optical TSV structure 305, 308 may also proceed through half-mirror structure 320 and out through the opening of the polished epi semiconductor layer 316. However, given the width of the polished epi semiconductor layer 316, received optical signals should be properly aligned with the half-mirror interface surface 320 on the angled silicon etch surface 308. To assist with alignment of received optical signals, the size of the opening may be tuned or reduced to promote signal alignment.

Figure 30:
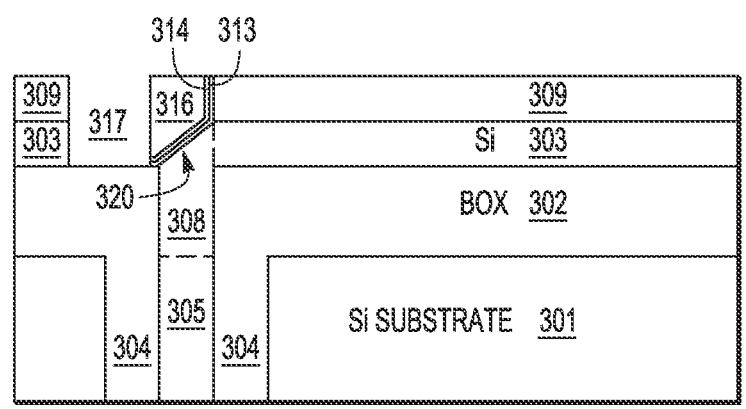

To illustrate an example technique for tuning the size of the optical half-mirror structure formed with the half-mirror structure 320, reference is now made to FIG. 30 illustrates processing of the semiconductor wafer structure subsequent to FIG. 29 with the partial cutaway side view after forming a recess opening 317 by selectively removing the portion of the (polished) epi semiconductor layer 316 not located above the mirror interface surface 320. In selected embodiments, the recess opening 317 is formed to a depth so that the bottom of recess 317 is coplanar with the top of the buried oxide layer 302. And while any desired selective removal process may be used, in selected embodiments, the recess opening 317 may be formed by patterning a mask of photo resist or other masking material (not shown) to protect the portion of the (polished) epi semiconductor layer 316 over the mirror interface surface 320. The unmasked epi layer 316 is removed by etching with appropriate etch chemistries, such as an anisotropic timed etch that is selective with respect to the masking material. For example, a chlorine containing etch chemistry or more generally a halogen containing etch chemistry maybe used, but other etch chemistries for etching silicon may be used. In addition to removing a portion of the epi semiconductor layer 316, the etch process may also remove part of the dielectric mirror layer(s) 313-314 formed on the buried oxide layer 302, while retaining the dielectric mirror layer(s) 313-314 at the interface of the angled silicon etch surface 308.

Figure 31:
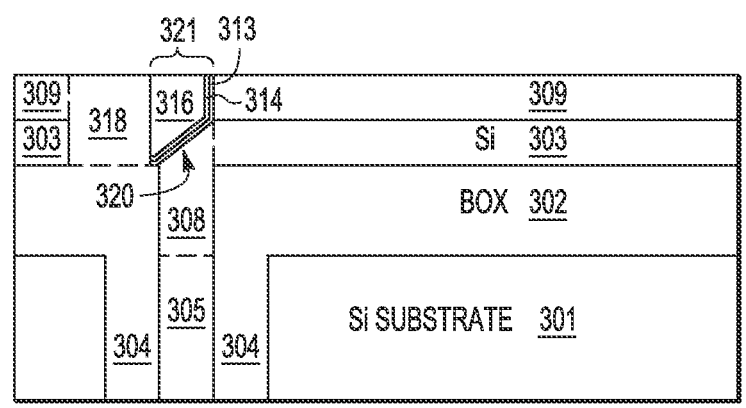

FIG. 31 illustrates processing of the semiconductor wafer structure subsequent to FIG. 30 with the partial cutaway side view after dielectric fill material 318 is formed in the recess opening 317. In selected embodiments, the dielectric layer 318 is formed by depositing silicon oxide with a CVD or thermal deposition process at a sufficient thickness to fill the etched silicon opening(s) 317, followed by a planarization or CMP of the wafer structure.

As a consequence of the foregoing fabrication sequence, an integrated optical half-mirror structure is formed with the polished epi semiconductor layer 316 having a reduced or tuned opening 321 above the half-mirror interface surface 320. Optical signal information received through this opening 321 (in a transmission path perpendicular to the lateral plane of the semiconductor wafer structure) may be partially deflected perpendicularly to proceed through the waveguide beam structure formed by the silicon substrate layer 303

(and within the lateral plane of the semiconductor wafer structure), and may partially pass through the half-mirror interface surface 320 and down through the optical TSV 305, 308. By the same token, optical signal information received through the waveguide beam structure formed by the silicon substrate layer 303 may be partially deflected perpendicularly to proceed in a transmission path perpendicular to the lateral plane of the semiconductor wafer structure and through this opening 321.

By now it should be appreciated that there is provided herein an integrated circuit apparatus with an out-of-plane mirror and associated methods of operation and fabrication. In the disclosed fabrication process, a wafer is provided that includes an optical waveguide semiconductor structure or layer formed over one or more dielectric layers on a substrate, such as by providing an SOI substrate having an optical waveguide silicon layer located over a buried oxide layer. In selected embodiments, an optical through-semiconductor via is formed in the SOI substrate in optical alignment with the mirror. The wafer is processed with an anisotropic wet etch process to selectively etch the optical waveguide semiconductor structure to form an angled semiconductor sidewall surface on the optical waveguide semiconductor structure. In selected embodiments, the anisotropic wet etch process applies an etchant (e.g., KOH, EDP, TMAH, $N_2H_4$, or CsOH) having high crystallographic plane selectivity. By applying a silicon orientation-dependent wet etch process, a first recess opening is produced with 45 degree angled semiconductor sidewall surfaces. Subsequently, the angled semiconductor sidewall surfaces on the optical waveguide semiconductor structure are processed to form a mirror for deflecting optical signals into and out of a lateral plane that is parallel to a major wafer substrate surface. In selected embodiments, the angled semiconductor sidewall surfaces are processed by selectively forming one or more patterned oxidation protection layers on the angled semiconductor sidewall surface of the optical waveguide semiconductor structure to expose a first portion of the optical waveguide semiconductor structure defining a first angled semiconductor sidewall surface and to cover a second portion of the optical waveguide semiconductor structure. Subsequently, the first portion of the optical waveguide semiconductor structure is oxidized (e.g., with a LOCOS thermal oxidation process) to produce an oxide layer with an angled oxide sidewall surface substantially co-located or parallel to where the first angled semiconductor sidewall surface was located prior to oxidation. After removing at least the one or more patterned oxidation protection layers to form a recess opening in the optical wafer, an epitaxial semiconductor layer is grown in the recess opening from at least the second portion of the optical waveguide semiconductor structure to form the optical mirror at an interface between the epitaxial semiconductor layer and the angled oxide sidewall surface. In other embodiments, the angled semiconductor sidewall surface is processed by selectively forming one or more patterned oxidation protection layers to cover a first angled semiconductor sidewall surface of the optical waveguide semiconductor structure and to expose a second angled semiconductor sidewall surface of the optical waveguide semiconductor structure. Subsequently, the second angled semiconductor sidewall surface is oxidized to produce an oxide mirror layer substantially co-located or parallel to where the second angled semiconductor sidewall surface was located prior to oxidation. After removing the patterned oxidation protection layer(s) to form a recess opening in the optical wafer which exposes the first angled semiconductor sidewall surface, an epitaxial semiconductor layer is grown in the recess opening from at least the first angled semiconductor sidewall surface of the optical waveguide semiconductor structure to form the optical mirror at an interface between the epitaxial semiconductor layer and the oxide mirror layer. In other embodiments having a through-silicon via formed in the substrate, the angled semiconductor sidewall surface is processed by selectively forming one or more patterned dielectric mirror layers to directly cover a first angled semiconductor sidewall surface of the optical waveguide semiconductor structure which is aligned with the optical through-silicon via formed in the substrate, and to expose a second angled semiconductor sidewall surface of the optical waveguide semiconductor structure. Subsequently, a planarized optical semiconductor layer is formed over the one or more patterned dielectric mirror layers on the first angled semiconductor sidewall surface by growing an epitaxial semiconductor layer from at least the exposed second angled semiconductor sidewall surface of the optical waveguide semiconductor structure. With the processing of the angled semiconductor sidewall surface described herein, a mirror may be formed for perpendicularly deflecting optical signals into and out of the lateral plane of the wafer or finally formed device.

In another form, there is provided a semiconductor device and associated fabrication method. In the disclosed methodology, a semiconductor on insulator wafer is provided that includes a silicon substrate layer, a buried oxide layer formed over the silicon substrate layer, and a semiconductor optical beam structure formed on the buried oxide layer. In selected embodiments, an optical through-silicon via is formed in the silicon substrate layer in optical alignment with a predetermined optical mirror location. On the wafer, a patterned etch mask layer is formed over the semiconductor optical beam structure to provide a first etch opening over the predetermined optical mirror location. Using the patterned etch mask layer as an etch mask, the semiconductor optical beam structure is selectively etched with an anisotropic wet etch process to form a first recess opening in the semiconductor optical beam structure with a first angled silicon sidewall surface and a bottom silicon layer. For example, an anisotropic wet etchant selected from the group consisting of KOH, EDP, TMAH, $N_2H_4$, or CsOH has a high crystallographic plane selectivity that can be used as a silicon orientation-dependent wet etchant to produce the first recess opening with 45 degree angled silicon sidewall surfaces. Subsequently, the first angled sidewall surface may be used to form a dielectric structure having a second angled sidewall surface, wherein the second angled sidewall surface of the dielectric structure is used to form an optical mirror for deflecting optical signals into and out of a lateral plane that is parallel to a major lateral surface of the semiconductor optical beam structure. This may be done by selectively forming one or more patterned dielectric layers to cover a first angled semiconductor sidewall surfaces of the semiconductor optical beam structure and a first portion of the semiconductor optical beam structure defining the first angled semiconductor sidewall surface, and to expose a second portion of the semiconductor optical beam structure defining a second angled semiconductor sidewall surface. The exposed second portion of the semiconductor optical beam structure is oxidized (e.g., with a LOCOS thermal oxidation process) to produce an oxide layer with an angled oxide sidewall surface at the predetermined optical mirror location. After removing the patterned dielectric layer(s), a second recess opening is formed over at least the angled oxide sidewall surface at the predetermined optical mirror location. In the second recess opening, an epitaxial semiconductor layer is grown from at least the first portion of the semiconductor optical beam structure to form the optical mirror at an interface between the epitaxial semiconductor layer and the angled oxide sidewall surface. By applying a CMP process to polish the epitaxial semiconductor layer in the second recess opening, a planarized semiconductor waveguide beam layer is formed above the optical mirror. The planarized silicon waveguide beam layer may then be selectively etched to form a third recess opening in the planarized silicon waveguide beam layer, where the third recess opening does not overly the optical mirror and extends down to an upper surface of the semiconductor optical beam structure. By filling the third recess opening with a planarized oxide layer, the width dimension of the planarized silicon waveguide beam layer is narrowed to align with the optical mirror.

In yet another form, there is provided an optical backplane semiconductor device and associated fabrication process. In the disclosed semiconductor device, a semiconductor substrate is formed in a lateral substrate plane. In addition, one or more dielectric layers are formed over the semiconductor substrate, and first optical waveguide semiconductor structure is formed over the one or more dielectric layers and in a second lateral plane that is parallel to the lateral substrate plane. The first optical waveguide semiconductor structure includes a lateral waveguide portion with an end portion for conveying optical signals in a lateral plane. The semiconductor device also includes an optical mirror located at the end portion of the optical waveguide semiconductor structure for deflecting optical signals into and/or out of the lateral waveguide portion of the first optical waveguide semiconductor structure. In selected embodiments, the optical mirror includes an angled interface surface between a silicon structure and an adjacent oxide layer, where the angled interface surface is offset by 45 degrees from the lateral plane. The optical mirror may be formed as a full mirror or a half mirror, in which case the semiconductor device may include a second optical waveguide semiconductor structure positioned on an opposite side of the optical mirror from the first optical waveguide semiconductor structure to receive a portion of an optical signal that is not reflected by the optical mirror. In selected embodiments, the second optical waveguide semiconductor structure is a lateral structure positioned in the lateral plane, and in other embodiments, the second optical waveguide semiconductor structure is a vertical structure positioned perpendicularly to the lateral plane. Depending on orientation of the optical mirror, the optical mirror deflects optical signals above the lateral plane or below the lateral plane and into an optical through hole via structure formed in a substrate.

Although the described exemplary embodiments disclosed herein are directed to various optical backplane devices with MEMS optical beam waveguide and interconnect features, including optical backplane mirror structures, and methods for making same, the present invention is not necessarily limited to the example embodiments which illustrate inventive aspects of the present invention that are applicable to a wide variety of fabrication processes and/or structures. Thus, the particular embodiments disclosed above are illustrative only and should not be taken as limitations upon the present invention, as the invention may be modified and practiced in different but equivalent manners apparent to those skilled in the art having the benefit of the teachings herein. For example, while the optical backplane mirror structures are described with example fabrication sequence details, this is merely for convenience of explanation and not intended to be limiting and persons of skill in the art will understand that the principles taught herein apply to other fabrication processes and materials so that optical mirror structures may be formed in integrated circuit die other than optical backplane die. Moreover, the thicknesses, materials, and processing of the described layers may deviate from the disclosed examples. In addition, the terms of relative position used in the description and the claims, if any, are interchangeable under appropriate circumstances such that embodiments of the invention described herein are, for example, capable of operation in other orientations than those illustrated or otherwise described herein. The term "coupled." as used herein, is defined as directly or indirectly connected in an electrical or non-electrical manner. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A semiconductor fabrication process comprising:
providing a wafer comprising an optical waveguide semiconductor structure;
selectively etching the optical waveguide semiconductor structure with an anisotropic wet etch process to form an angled semiconductor sidewall surface on the optical waveguide semiconductor structure; and
processing the angled semiconductor sidewall surface on the optical waveguide semiconductor structure to form a mirror for deflecting optical signals into and out of a lateral plane that is parallel to a major wafer substrate surface,
where the wafer comprises a semiconductor-on-insulator (SOI) substrate with an optical through-semiconductor via structure formed in the SOI substrate in optical alignment with the mirror.

2. The process of claim 1, where providing the wafer comprises providing a semiconductor-on-insulator substrate comprising an optical waveguide silicon layer formed over a buried oxide layer.

3. The process of claim 1, where the optical waveguide semiconductor structure comprises a silicon layer located over a buried oxide layer.

4. The process of claim 1, where the anisotropic wet etch process comprises an etchant having high crystallographic plane selectivity, said etchant including at least one of the group consisting of KOH, EDP, TMAH, $N_2H_4$, and CsOH.

5. The process of claim 1, where the anisotropic wet etch process comprises a silicon orientation-dependent wet etch process that produces a first recess opening with 45 degree angled semiconductor sidewall surfaces.

6. The process of claim 1, where processing the angled semiconductor sidewall surface comprises:
- selectively forming one or more patterned oxidation protection layers on the angled semiconductor sidewall surface of the optical waveguide semiconductor structure to expose a first portion of the optical waveguide semiconductor structure defining a first angled semiconductor sidewall surface and to cover a second portion of the optical waveguide semiconductor structure;
- oxidizing the first portion of the optical waveguide semiconductor structure with a semiconductor oxidation process to produce an oxide layer with an angled oxide sidewall surface substantially parallel to where the first angled semiconductor sidewall surface was located prior to oxidation;
- removing at least the one or more patterned oxidation protection layers to form a recess opening in the wafer; and
- growing an epitaxial semiconductor layer in the recess opening from at least the second portion of the optical waveguide semiconductor structure to form the mirror at an interface between the epitaxial semiconductor layer and the angled oxide sidewall surface.

7. The process of claim 6, where oxidizing the first portion of the optical waveguide semiconductor structure comprises performing a LOCal Oxidation of Silicon (LOCOS) process to thermally oxidize the first portion of the optical waveguide semiconductor structure.

8. The process of claim 1, where processing the angled semiconductor sidewall surface comprises:
- selectively forming one or more patterned oxidation protection layers to cover a first angled semiconductor sidewall surface of the optical waveguide semiconductor structure and to expose a second angled semiconductor sidewall surface of the optical waveguide semiconductor structure;
- oxidizing the second angled semiconductor sidewall surface with a semiconductor oxidation process to produce an oxide mirror layer substantially parallel to the second angled semiconductor sidewall surface was located prior to oxidation;
- removing at least the one or more patterned oxidation protection layers to form a recess opening in the wafer which exposes the first angled semiconductor sidewall surface; and
- growing an epitaxial semiconductor layer in the recess opening from at least the first angled semiconductor sidewall surface of the optical waveguide semiconductor structure to form the mirror at an interface between the epitaxial semiconductor layer and the oxide mirror layer.

9. The process of claim 1, where processing the angled semiconductor sidewall surface comprises:
- selectively forming one or more patterned dielectric mirror layers to directly cover a first angled semiconductor sidewall surface of the optical waveguide semiconductor structure which is aligned with the optical through-semiconductor via formed in the substrate, and to expose a second angled semiconductor sidewall surface of the optical waveguide semiconductor structure; and
- forming a planarized optical semiconductor layer over the one or more patterned dielectric mirror layers on the first angled semiconductor sidewall surface by growing an epitaxial semiconductor layer from at least the exposed second angled semiconductor sidewall surface of the optical waveguide semiconductor structure.

10. The process of claim 1, where processing the angled semiconductor sidewall surface comprises forming a mirror for perpendicularly deflecting optical signals into and out of the lateral plane.

11. The process of claim 1, where the mirror is positioned to deflect optical signals between the optical waveguide semiconductor structure in the lateral plane and the optical through-semiconductor via structure below.

12. The process of claim 1, where the mirror comprises a half mirror.

13. The process of claim 1, where the mirror comprises a full mirror.

14. A semiconductor fabrication process comprising:
- providing a wafer comprising an optical waveguide semiconductor structure;
- selectively etching the optical waveguide semiconductor structure with an anisotropic silicon orientation-dependent wet etch process to form an angled semiconductor sidewall surface on the optical waveguide semiconductor structure by etching a first recess opening with 45 degree angled semiconductor sidewall surfaces; and
- processing the angled semiconductor sidewall surface on the optical waveguide semiconductor structure to form a mirror for deflecting optical signals into and out of a lateral plane that is parallel to a major wafer substrate surface,
- where the wafer comprises a semiconductor-on-insulator (SOI) substrate with an optical through-semiconductor via structure formed in the SOI substrate in optical alignment with the mirror.

15. The process of claim 14, where providing the wafer comprises providing a semiconductor-on-insulator substrate comprising an optical waveguide silicon layer formed over a buried oxide layer.

16. The process of claim 14, where the optical waveguide semiconductor structure comprises a silicon layer located over a buried oxide layer.

17. The process of claim 14, where the anisotropic wet etch process comprises an etchant having high crystallographic plane selectivity, said etchant including at least one of the group consisting of KOH, EDP, TMAH, N2H4, and CsOH.

18. A semiconductor fabrication process comprising:
- providing a wafer comprising an optical waveguide semiconductor structure;
- selectively etching the optical waveguide semiconductor structure with an anisotropic wet etch process to form an angled semiconductor sidewall surface on the optical waveguide semiconductor structure;
- selectively forming one or more patterned oxidation protection layers on the angled semiconductor sidewall surface of the optical waveguide semiconductor structure to expose a first portion of the optical waveguide semiconductor structure defining a first angled semiconductor sidewall surface and to cover a second portion of the optical waveguide semiconductor structure;
- oxidizing the first portion of the optical waveguide semiconductor structure with a semiconductor oxidation process to produce an oxide layer with an angled oxide sidewall surface substantially parallel to where the first angled semiconductor sidewall surface was located prior to oxidation;
- removing at least the one or more patterned oxidation protection layers to form a recess opening in the wafer; and growing an epitaxial semiconductor layer in the recess opening from at least the second portion of the optical waveguide semiconductor structure to form a mirror at an interface between the epitaxial semiconductor layer and the angled oxide sidewall surface for deflecting optical signals into and out of a lateral plane that is parallel to a major wafer substrate surface;

where the wafer comprises a semiconductor-on-insulator (SOI) substrate with an optical through-semiconductor via structure formed in the SOI substrate in optical alignment with the mirror.

19. The process of claim 18, where oxidizing the first portion of the optical waveguide semiconductor structure comprises performing a LOCal Oxidation of Silicon (LOCOS) process to thermally oxidize the first portion of the optical waveguide semiconductor structure.

20. A semiconductor fabrication process comprising:

providing a wafer comprising an optical waveguide semiconductor structure;

selectively etching the optical waveguide semiconductor structure with an anisotropic wet etch process to form an angled semiconductor sidewall surface on the optical waveguide semiconductor structure;

selectively forming one or more patterned oxidation protection layers to cover a first angled semiconductor sidewall surface of the optical waveguide semiconductor structure and to expose a second angled semiconductor sidewall surface of the optical waveguide semiconductor structure;

oxidizing the second angled semiconductor sidewall surface with a semiconductor oxidation process to produce an oxide mirror layer substantially parallel to the second angled semiconductor sidewall surface was located prior to oxidation;

removing at least the one or more patterned oxidation protection layers to form a recess opening in the wafer which exposes the first angled semiconductor sidewall surface; and growing an epitaxial semiconductor layer in the recess opening from at least the first angled semiconductor sidewall surface of the optical waveguide semiconductor structure to form a mirror at an interface between the epitaxial semiconductor layer and the oxide mirror layer for deflecting optical signals into and out of a lateral plane that is parallel to a major wafer substrate surface;

where the wafer comprises a semiconductor-on-insulator (SOI) substrate with an optical through-semiconductor via structure formed in the SOI substrate in optical alignment with the mirror.

21. A semiconductor fabrication process comprising:

providing a wafer comprising an optical waveguide semiconductor structure;

selectively etching the optical waveguide semiconductor structure with an anisotropic wet etch process to form an angled semiconductor sidewall surface on the optical waveguide semiconductor structure; and processing the angled semiconductor sidewall surface on the optical waveguide semiconductor structure to form a mirror for deflecting optical signals into and out of a lateral plane that is parallel to a major wafer substrate surface by:

selectively forming one or more patterned dielectric mirror layers to directly cover a first angled semiconductor sidewall surface of the optical waveguide semiconductor structure which is aligned with the optical through-semiconductor via formed in the substrate, and to expose a second angled semiconductor sidewall surface of the optical waveguide semiconductor structure; and forming a planarized optical semiconductor layer over the one or more patterned dielectric mirror layers on the first angled semiconductor sidewall surface by growing an epitaxial semiconductor layer from at least the exposed second angled semiconductor sidewall surface of the optical waveguide semiconductor structure;

where the wafer comprises a semiconductor-on-insulator (SOI) substrate with an optical through-semiconductor via structure formed in the SOI substrate in optical alignment with the mirror.

\* \* \* \* \*